United States Patent
Watanabe et al.

(10) Patent No.: US 7,715,337 B2
(45) Date of Patent: May 11, 2010

(54) WIRELESS COMMUNICATION SYSTEM, WIRELESS COMMUNICATION APPARATUS AND WIRELESS COMMUNICATION METHOD, AND COMPUTER PROGRAM

(75) Inventors: Kazuhiro Watanabe, Kanagawa (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 11/047,875

(22) Filed: Feb. 2, 2005

(65) Prior Publication Data

US 2005/0185628 A1    Aug. 25, 2005

(30) Foreign Application Priority Data

Feb. 6, 2004    (JP)    ............... P2004-031414
Jul. 1, 2004    (JP)    ............... P2004-195932

(51) Int. Cl.
*H04B 7/212*    (2006.01)
*H04J 3/06*    (2006.01)
(52) U.S. Cl. .................. 370/324; 370/347; 370/350; 370/503
(58) Field of Classification Search ................ 370/350, 370/347, 345, 329, 321, 324, 503, 509; 375/356
See application file for complete search history.

(56) References Cited

U.S. PATENT DOCUMENTS 5,987,024 A * 11/1999 Duch et al. ................. 370/350
6,594,273 B1 * 7/2003 McGibney ................... 370/442
6,894,975 B1 * 5/2005 Partyka ....................... 370/235
7,072,432 B2 * 7/2006 Belcea ........................ 375/356
7,184,413 B2 * 2/2007 Beyer et al. ................. 370/254
7,190,961 B2 * 3/2007 Burr ............................ 455/502
7,221,686 B1 * 5/2007 Belcea ........................ 370/509

(Continued)

FOREIGN PATENT DOCUMENTS

JP    4-287532    10/1992

(Continued)

OTHER PUBLICATIONS

Gurewitz, Omer; Cidon, Israel; and Sidi, Moshe; Network Time Synchronization Using Clock Offset Optimization; Proceedings of teh 11th IEEE International Conference on Network Protocols (ICNP '03), 2003.*

(Continued)

*Primary Examiner*—Daniel J Ryman
*Assistant Examiner*—Cassandra Decker
(74) *Attorney, Agent, or Firm*—Oblon, Spivak, McClelland, Maier & Neustadt, L.L.P.

(57) ABSTRACT

A wireless communication system is constructed by autonomous distributed operation of communication stations without having a relation of a controlling station and controlled stations. In the wireless communication system, each communication station checks a state of time synchronization with a neighboring station, determines whether the time synchronization needs to be corrected, and carries out one of methods of surely performing a time synchronization correcting process and performing the correcting process with a predetermined probability when the time synchronization needs to be corrected.

19 Claims, 29 Drawing Sheets

U.S. PATENT DOCUMENTS

| | | | |
|---|---|---|---|
| 7,315,546 B2* | 1/2008 | Repko et al. | 370/395.62 |
| 7,366,099 B2* | 4/2008 | Shand | 370/235 |
| 7,400,894 B2* | 7/2008 | Ebner et al. | 455/502 |
| 2002/0136335 A1* | 9/2002 | Liou et al. | 375/354 |
| 2004/0005902 A1* | 1/2004 | Belcea | 455/502 |
| 2004/0008661 A1* | 1/2004 | Myles et al. | 370/350 |
| 2004/0146043 A1* | 7/2004 | Hiraoka et al. | 370/350 |
| 2006/0029061 A1* | 2/2006 | Pister et al. | 370/389 |

FOREIGN PATENT DOCUMENTS

| | | |
|---|---|---|
| JP | 6-90202 | 3/1994 |
| JP | 2002-350577 | 12/2002 |

OTHER PUBLICATIONS

Elson, Jeremy; Girod, Lewis; and Estrin, Deborah; Fine-Grained Network Time Synchronization using Reference Broadcasts; Proceedings of the Fifth Symposium on Operating Systems Design and Implementation (OSDI 2002), Boston, MA, Dec. 2002.*

Ganeriwal, Saurabh; Kumar, Ram; and Srivastava, Mani B.; Timing-Sync Protocol for Sensor Networks; Networked and Embedded Systems Lab (NESL), University of California Los Angeles; SenSys '03, Nov. 5-7, 2003, Los Angeles, CA. pp. 138-149.*

Bjorklund, Patrik; Varbrand, Peter; and Yuan, Di; Resource Optimization of Spatial TDMA in Ad Hoc Radio Networks: A Column Generation Approach; IEEE, 2003.*

* cited by examiner

FIG. 4
| TA | Type | NBOI/NBAI | TOIS | ALERT | TxNUM | Serial | ETC |
FIG. 5
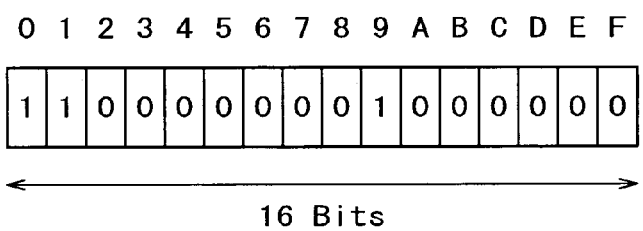
FIG. 6
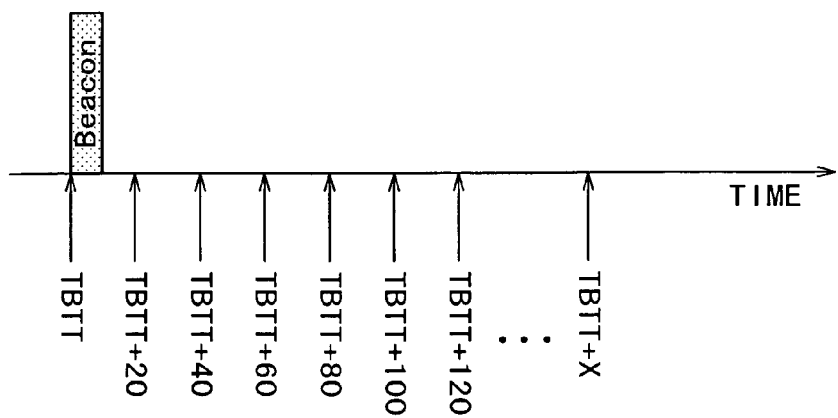

FIG. 14
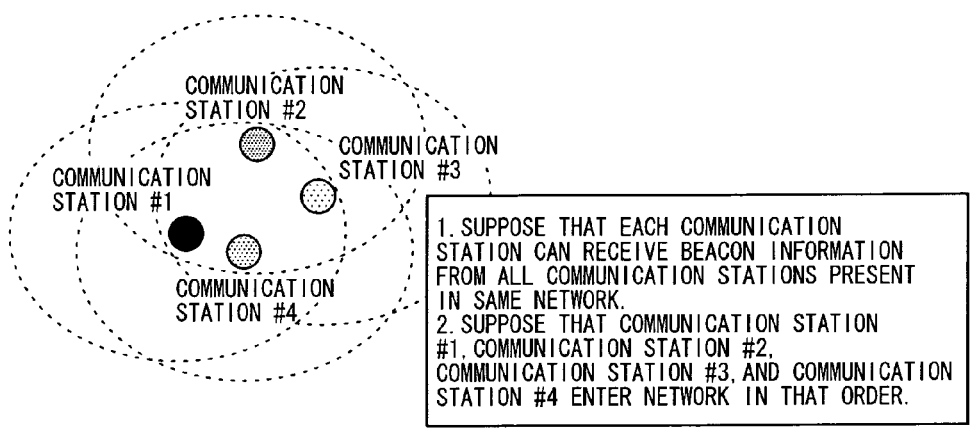
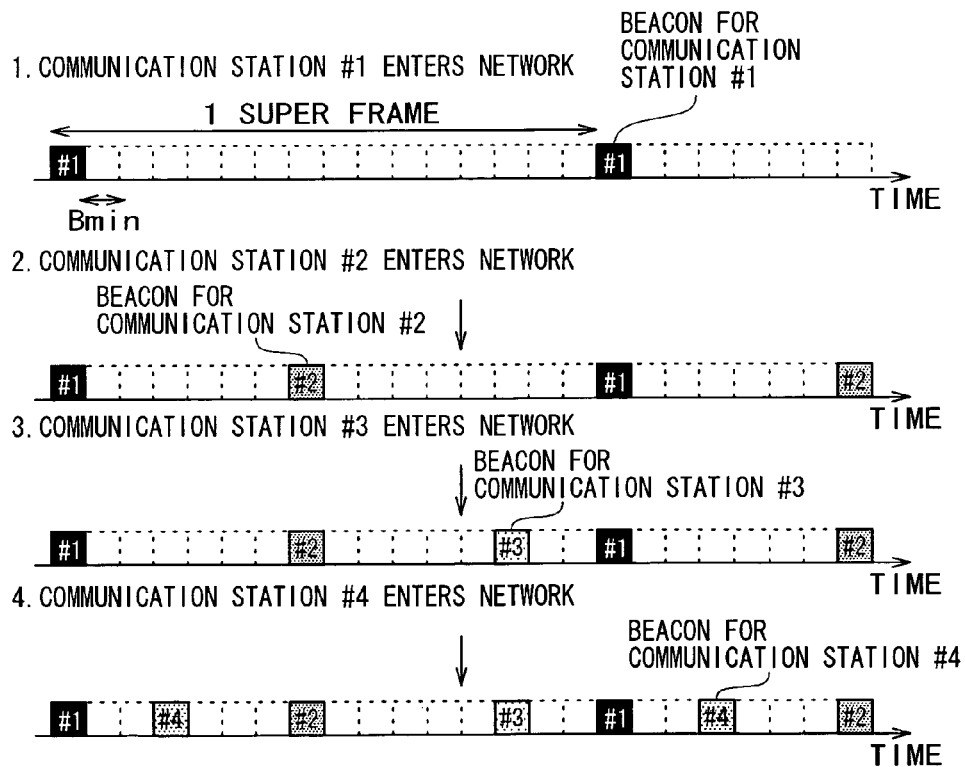

FIG. 15

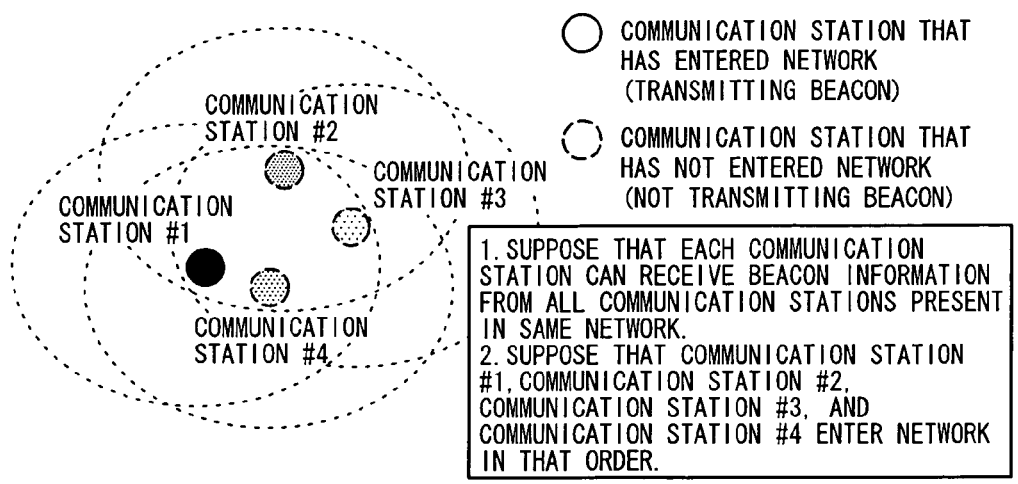

○ COMMUNICATION STATION THAT HAS ENTERED NETWORK (TRANSMITTING BEACON)

◯ COMMUNICATION STATION THAT HAS NOT ENTERED NETWORK (NOT TRANSMITTING BEACON)

1. SUPPOSE THAT EACH COMMUNICATION STATION CAN RECEIVE BEACON INFORMATION FROM ALL COMMUNICATION STATIONS PRESENT IN SAME NETWORK.
2. SUPPOSE THAT COMMUNICATION STATION #1, COMMUNICATION STATION #2, COMMUNICATION STATION #3, AND COMMUNICATION STATION #4 ENTER NETWORK IN THAT ORDER.

(EXAMPLE) COMMUNICATION STATION #2 ESTIMATES TIMING OF START OF SUPER FRAME OF COMMUNICATION STATION #1

(EXAMPLE 1) BEACON IS TRANSMITTED AT START OF TIME SLOT

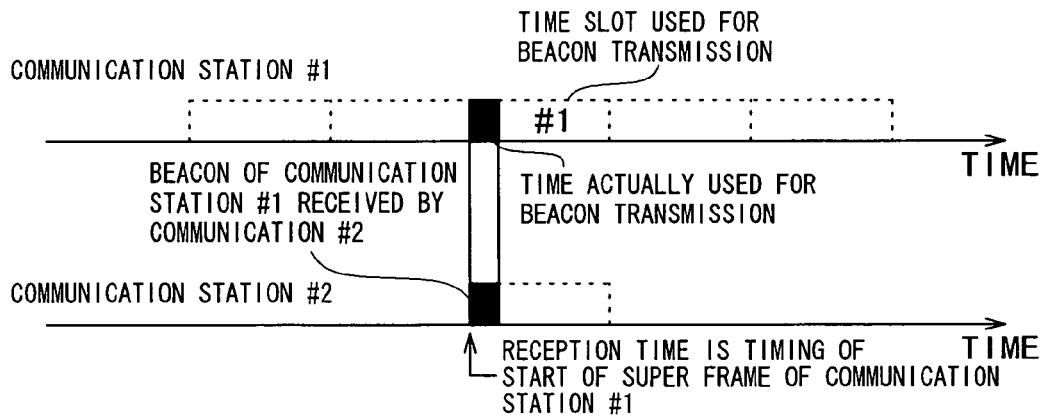

(EXAMPLE 1) BEACON IS TRANSMITTED WITHIN TIME SLOT

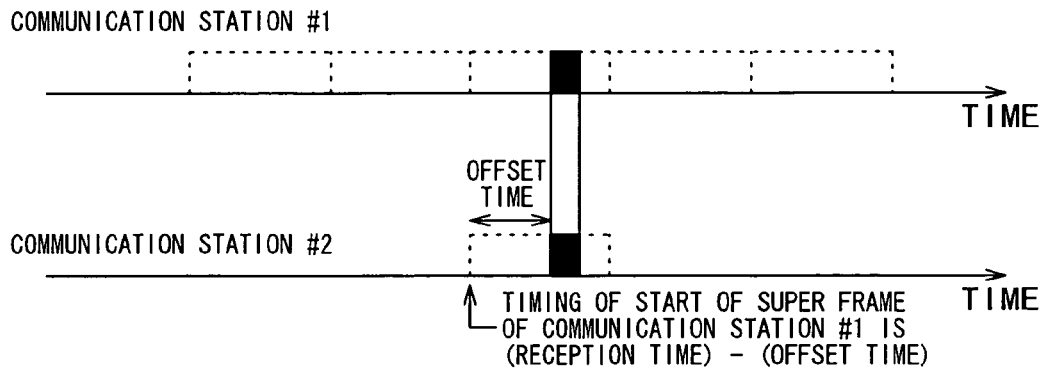

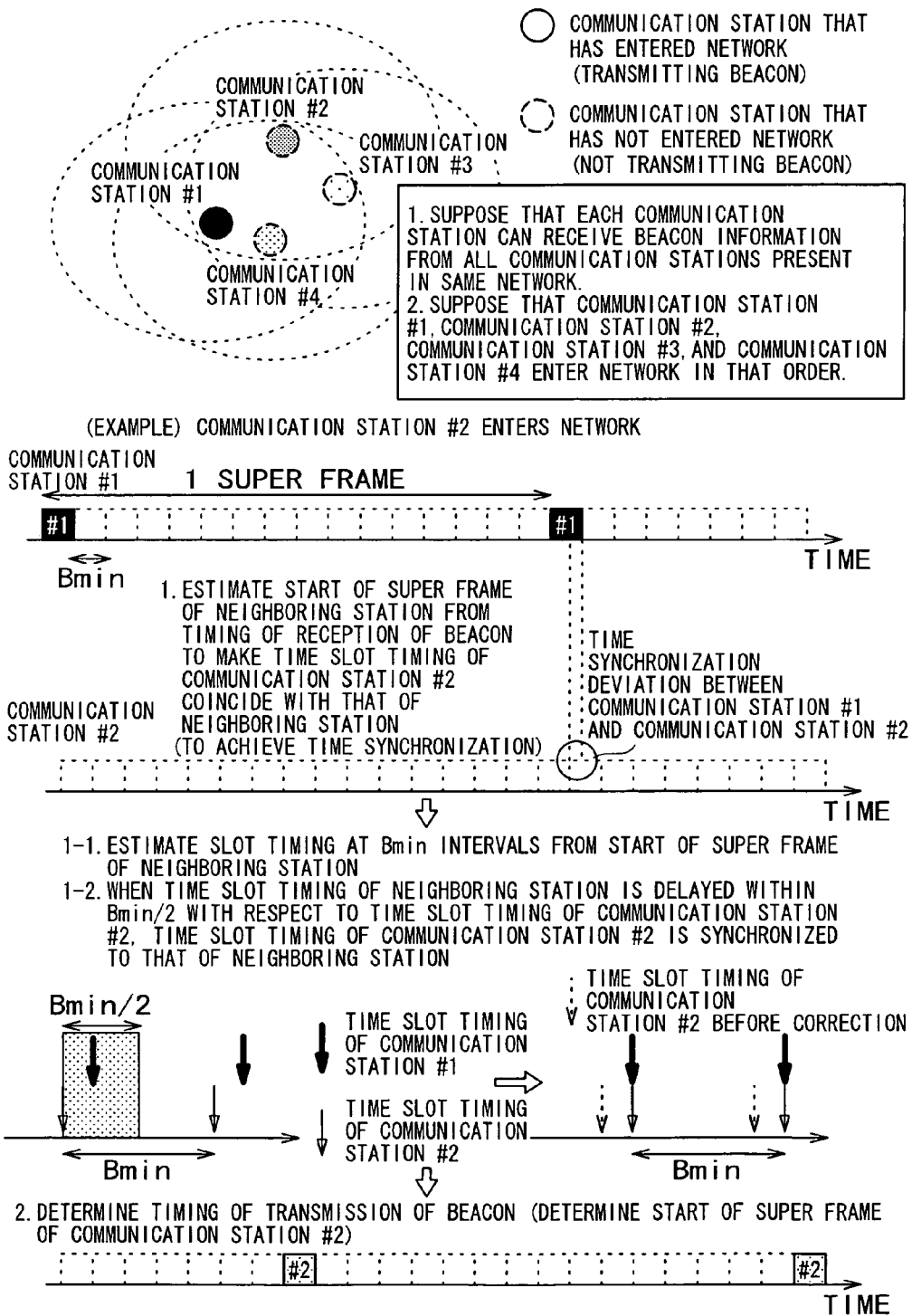

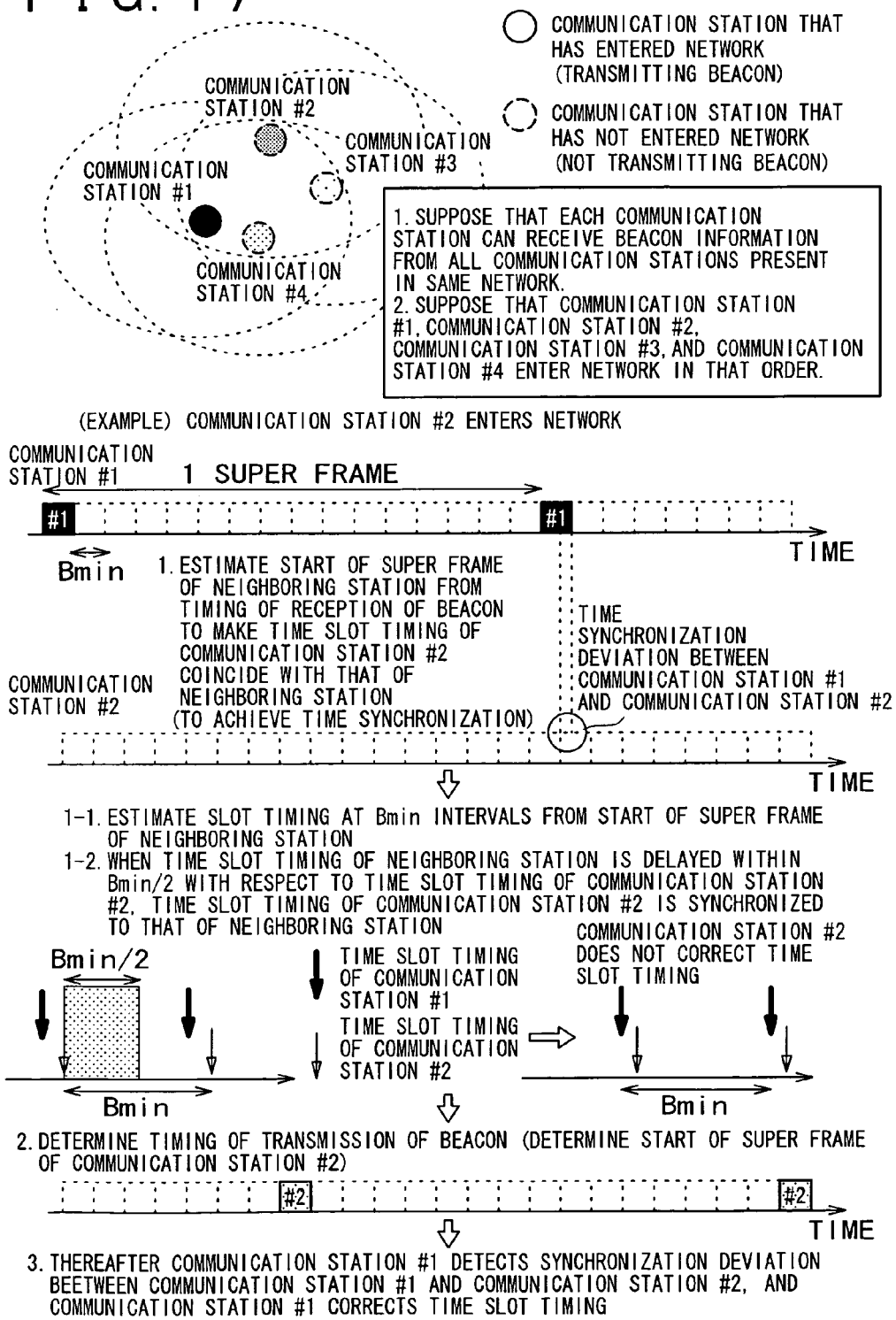

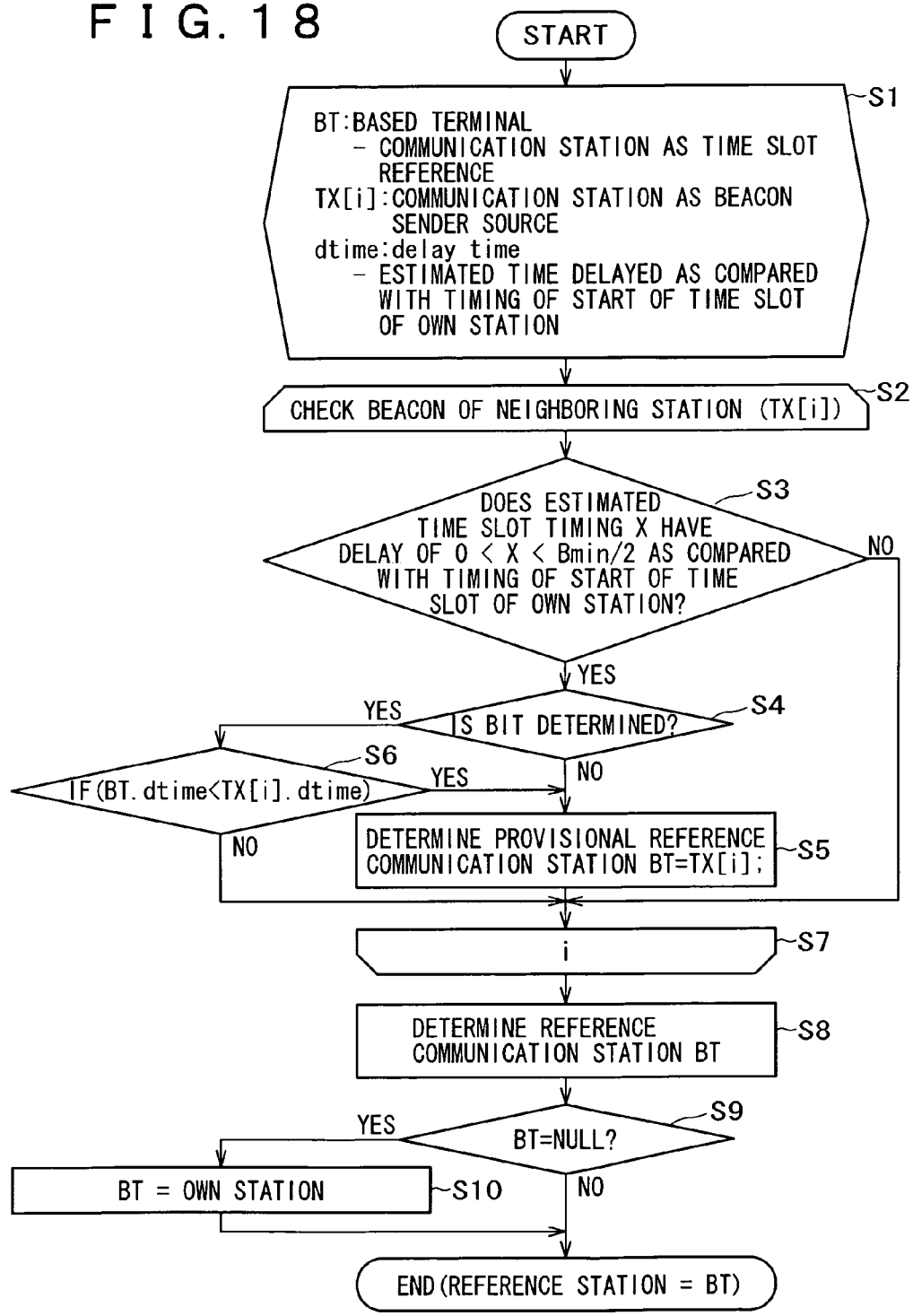

FIG. 19
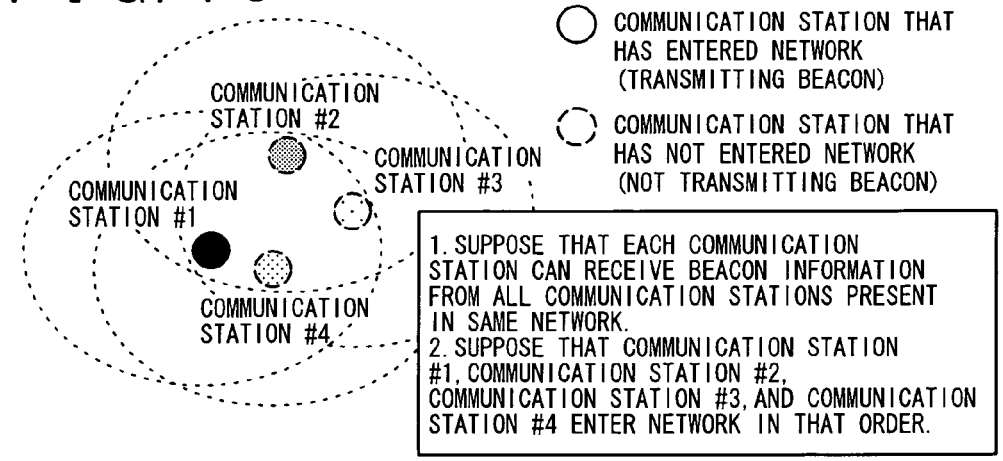
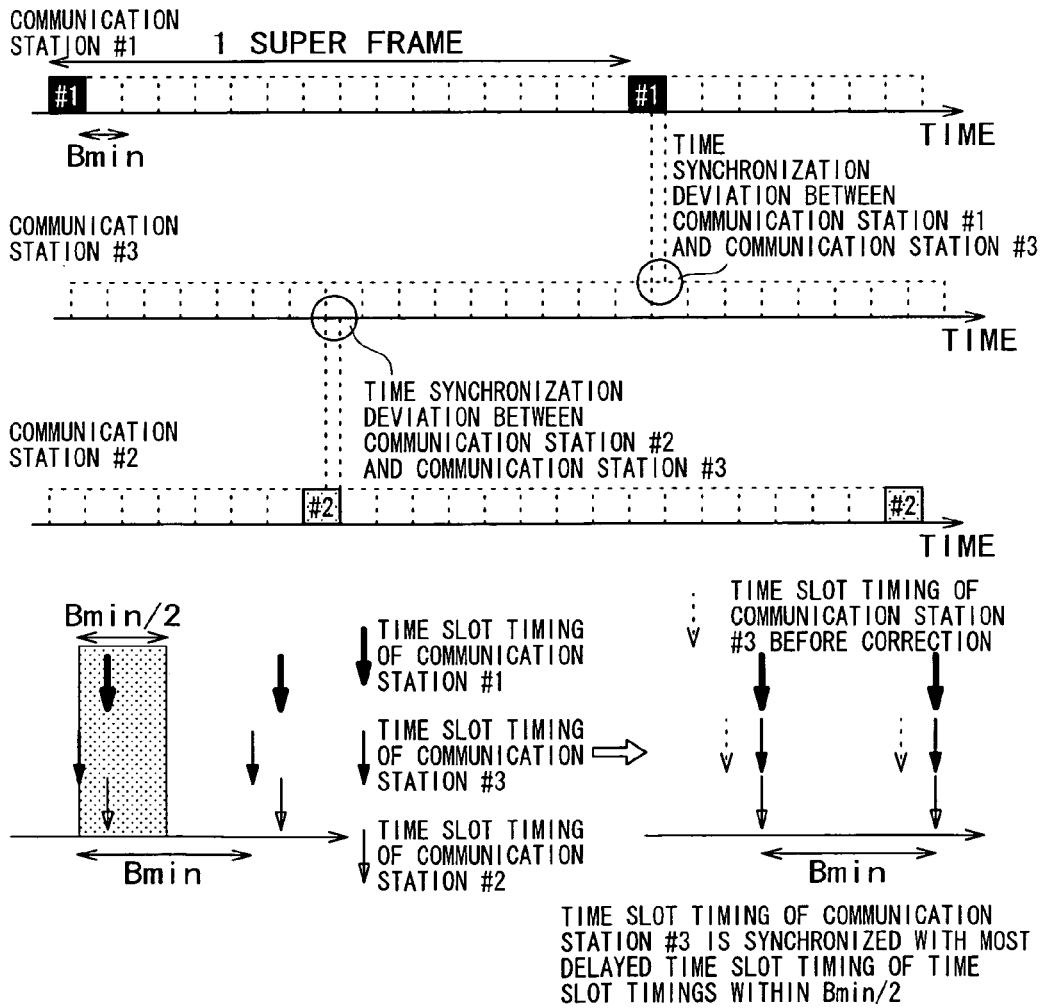

FIG. 21
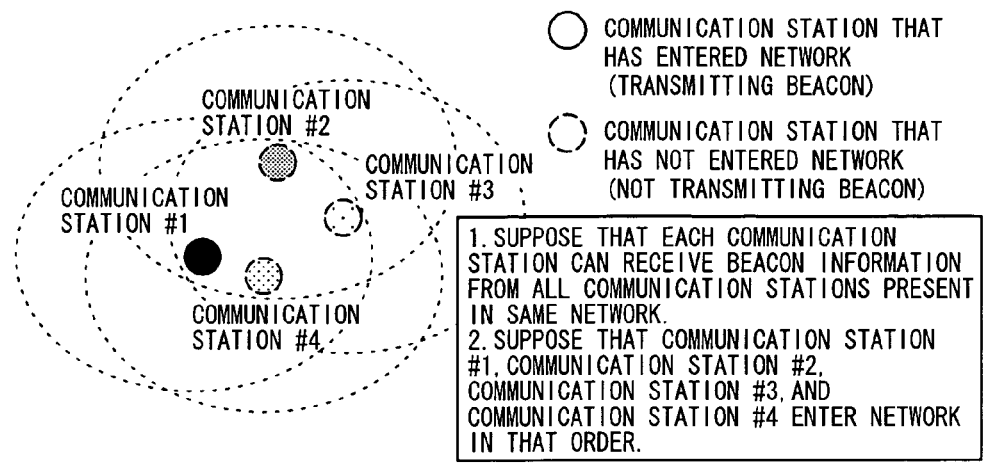
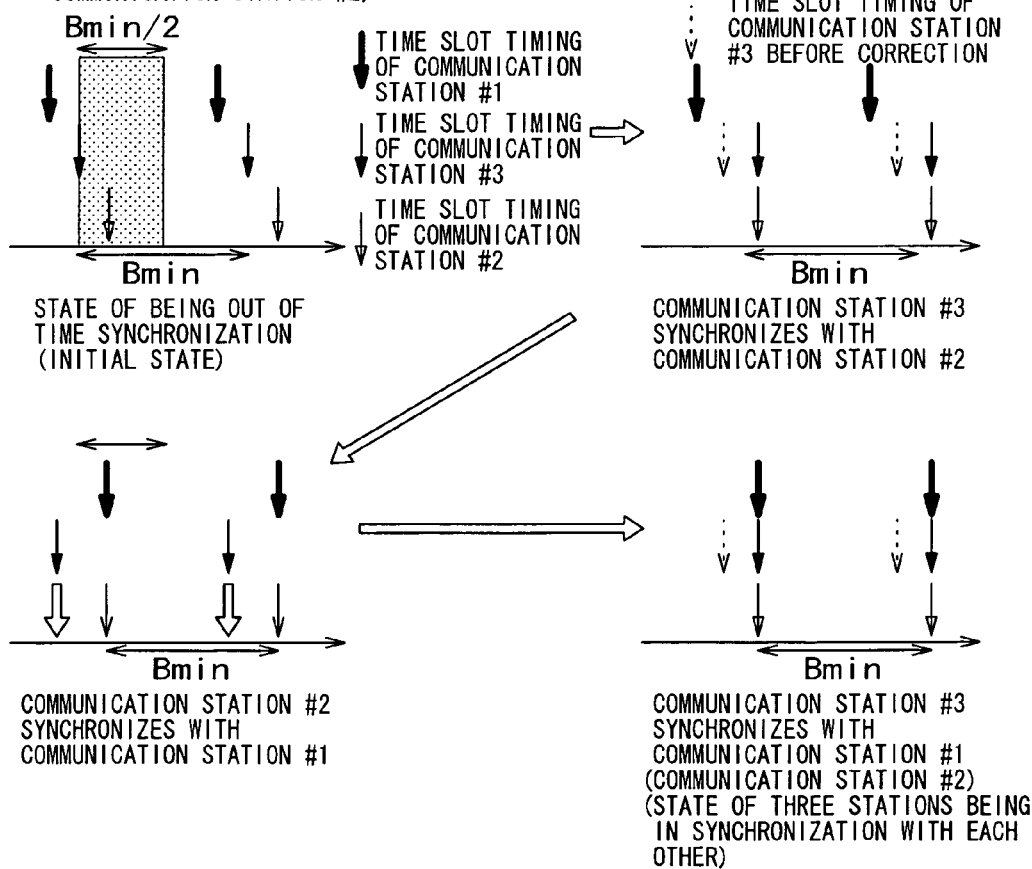

FIG. 22
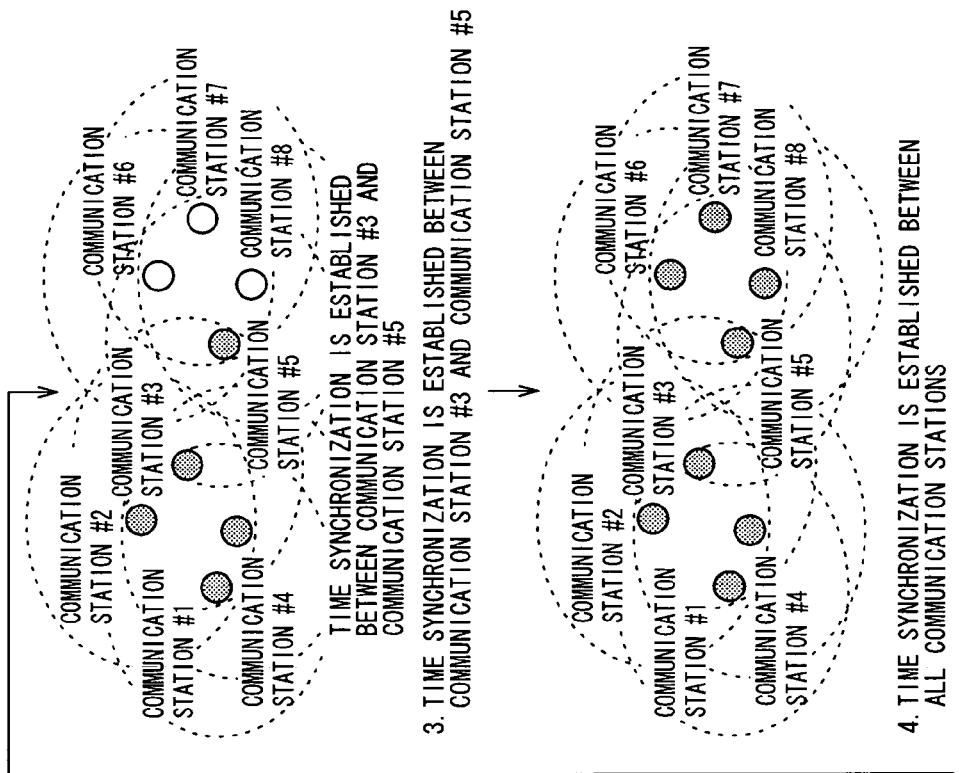
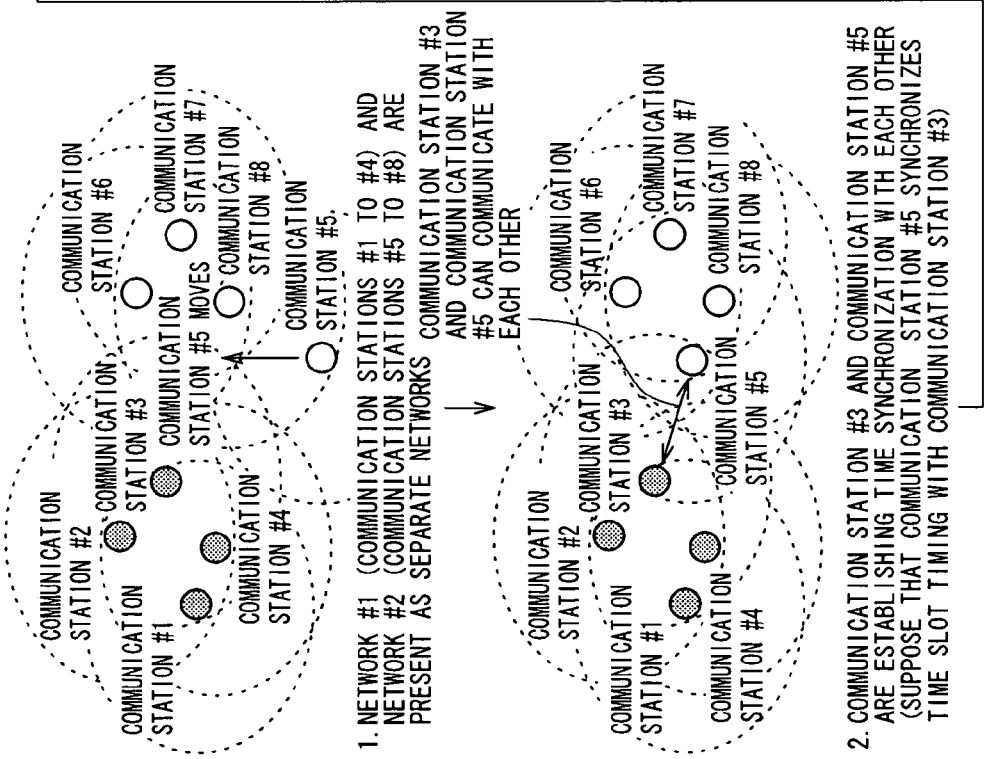

FIG. 24

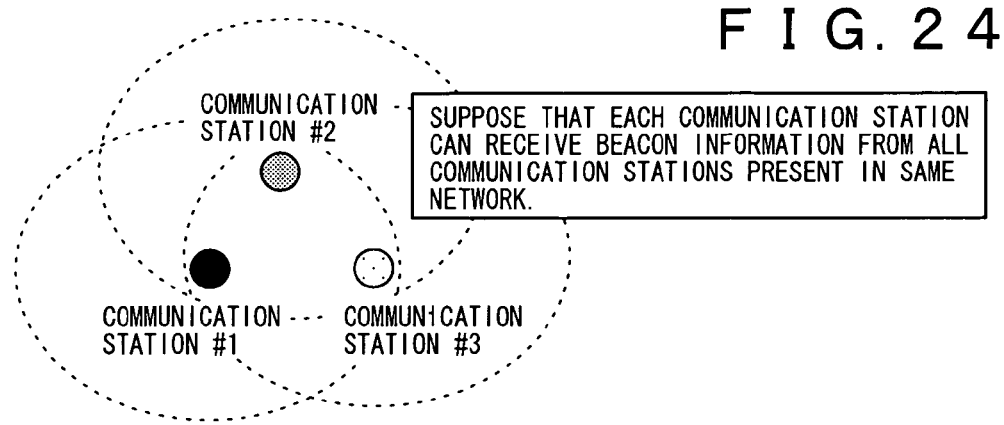

SUPPOSE THAT EACH COMMUNICATION STATION CAN RECEIVE BEACON INFORMATION FROM ALL COMMUNICATION STATIONS PRESENT IN SAME NETWORK.

1. WHEN RELATION OF EACH COMMUNICATION STATION TO COMMUNICATION STATION AS REFERENCE FOR TIME SYNCHRONIZATION IS COMMUNICATION STATION #1 → COMMUNICATION STATION #2, COMMUNICATION STATION #2 → COMMUNICATION STATION #3, COMMUNICATION STATION #3 → COMMUNICATION STATION #1,

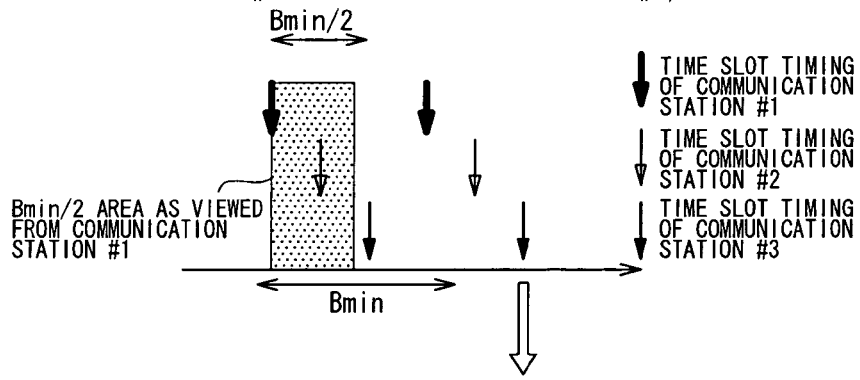

2. DEPENDING ON TIMING OF CORRECTION OF TIME SYNCHRONIZATION, CONVERGENCE MAY NOT BE ACHIEVED TO ESTABLISH TIME SYNCHRONIZATION.

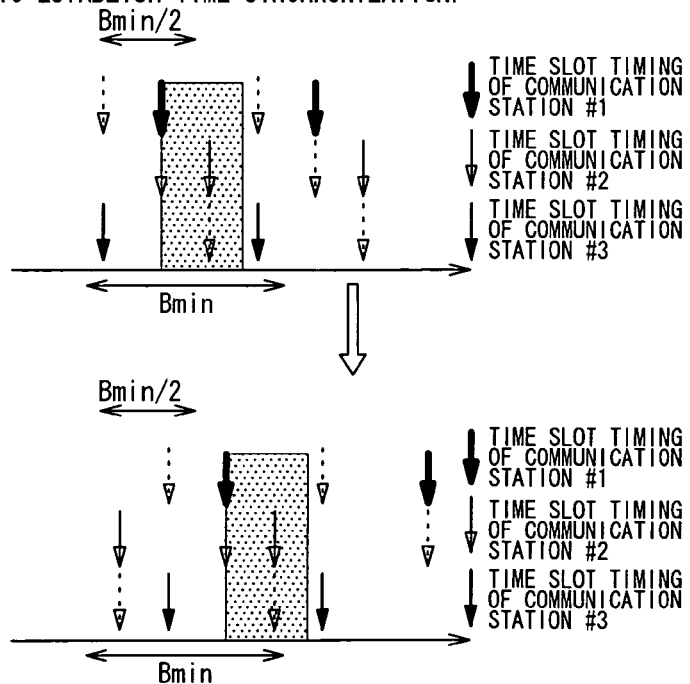

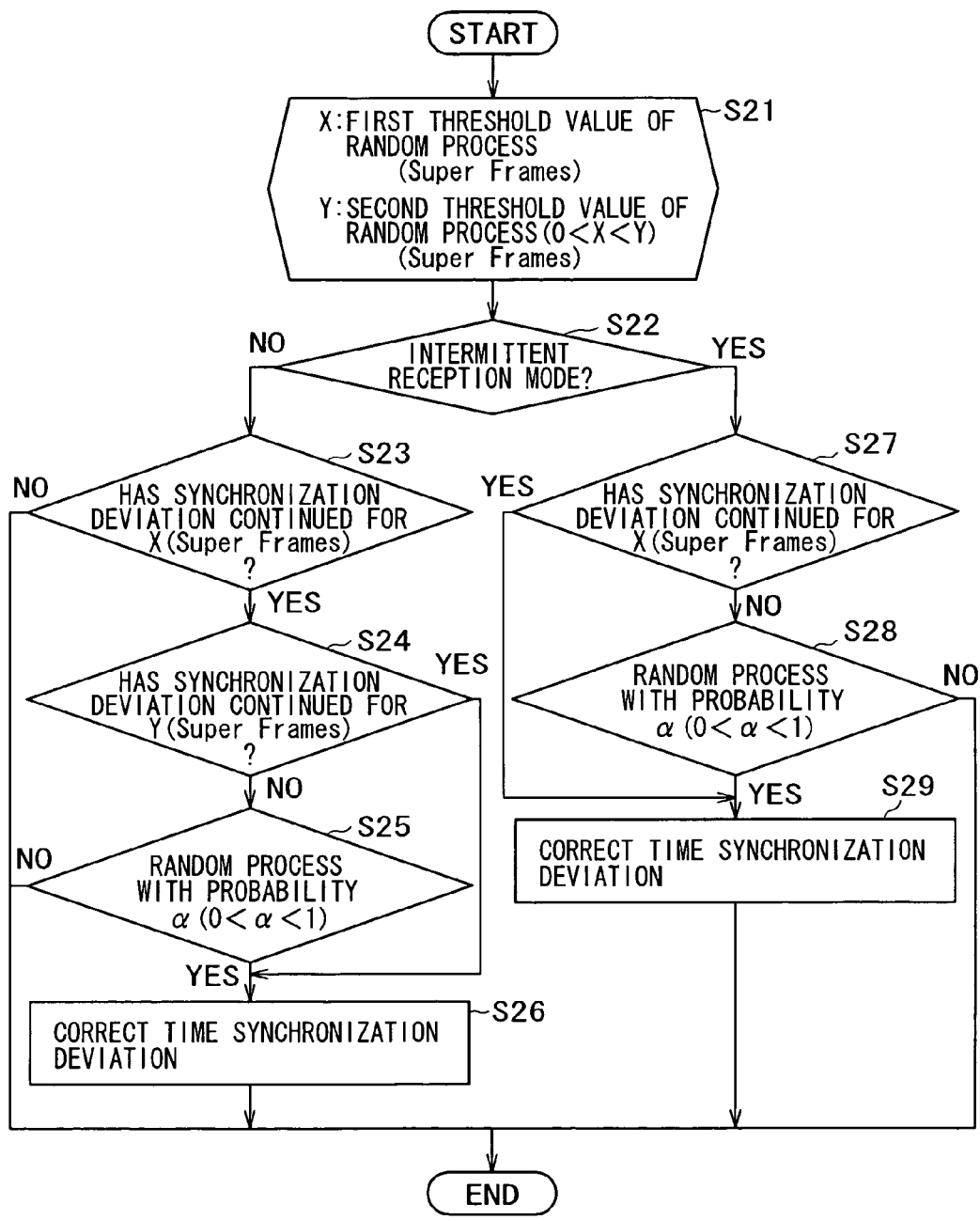

F I G. 2 7
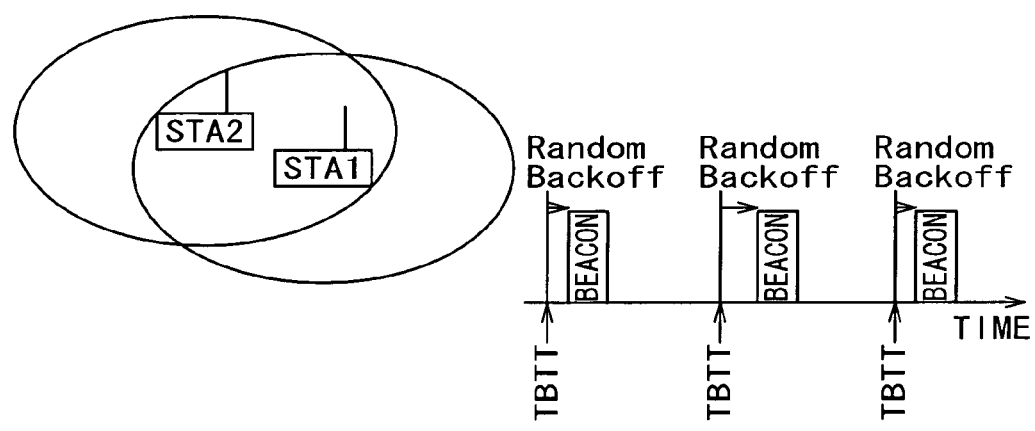

FIG. 31

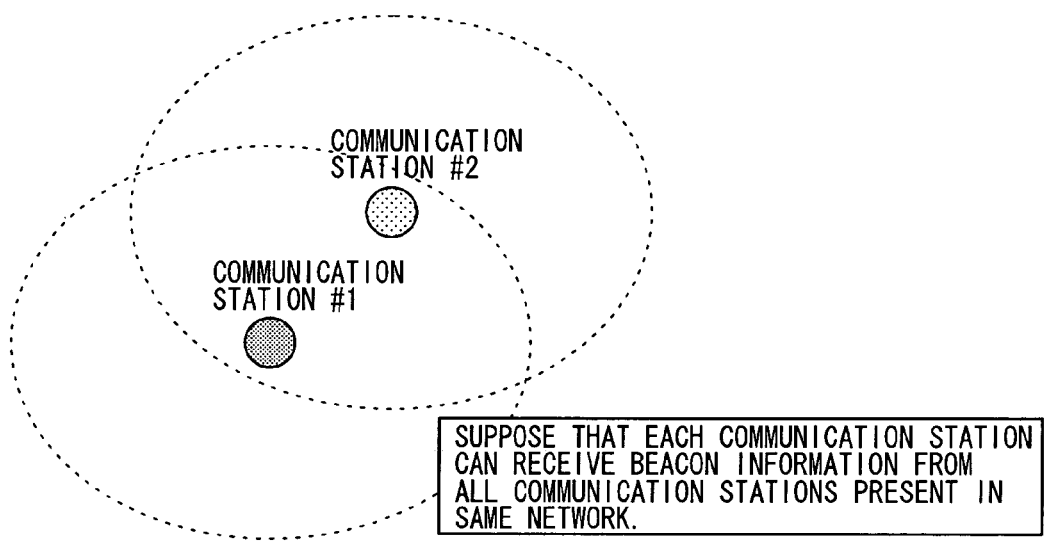

SUPPOSE THAT EACH COMMUNICATION STATION CAN RECEIVE BEACON INFORMATION FROM ALL COMMUNICATION STATIONS PRESENT IN SAME NETWORK.

1. WHEN THERE IS TIMING OF START OF TIME SLOT OF EACH COMMUNICATION STATION AS FOLLOWS,

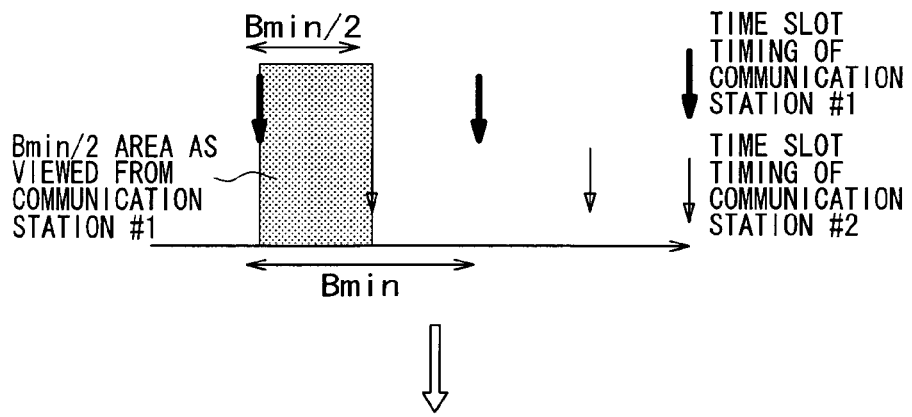

2. SINCE NEITHER OF COMMUNICATION STATIONS CAN BE REFERENCE STATION BY RULE FOR DETERMINING REFERENCE STATION THAT "0<TIMING OF START OF TIME SLOT<TBTT/2," PROCESS OF CORRECTION TIME SYNCHRONIZATION IS NOT PERFORMED.

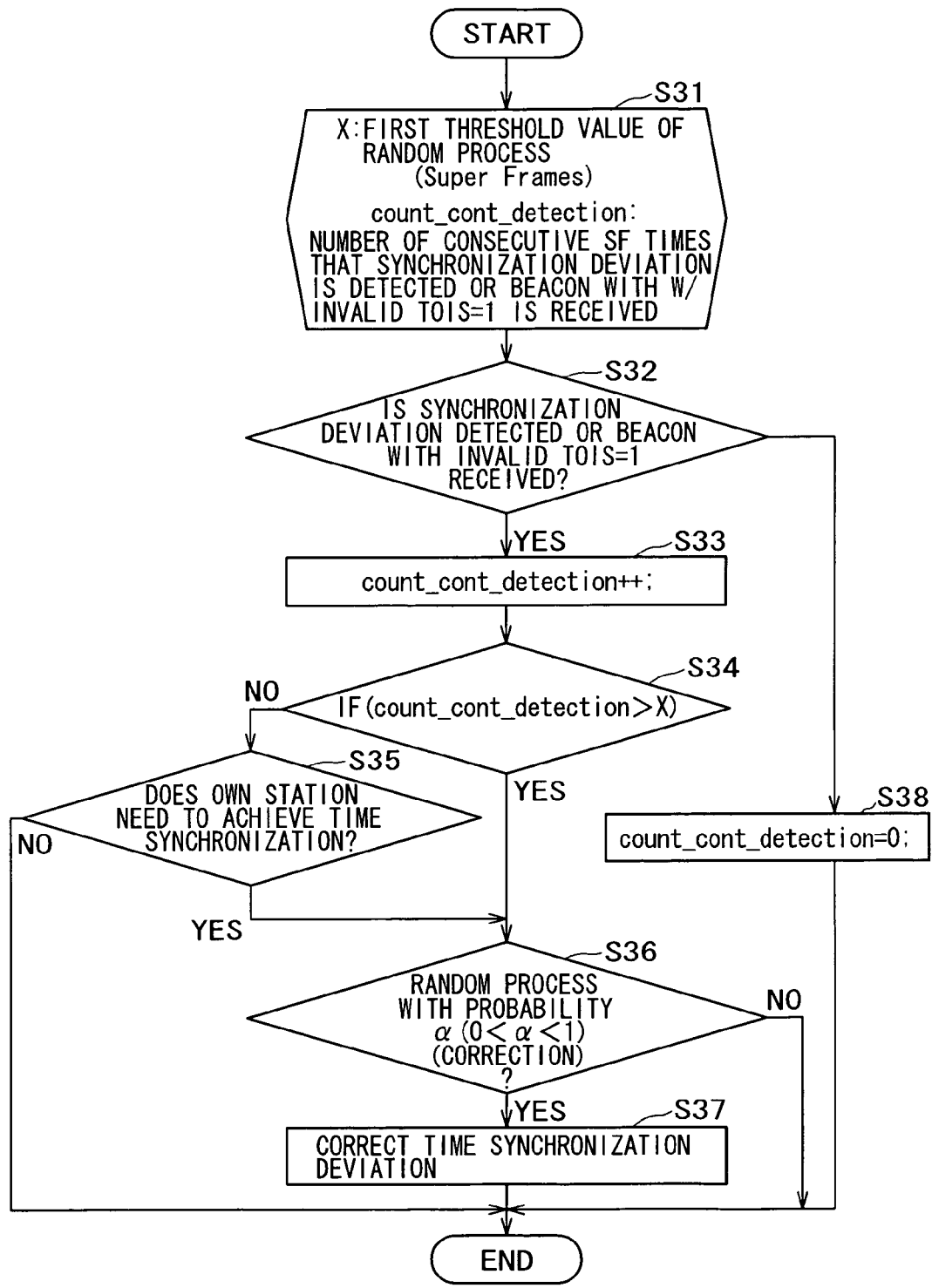

FIG. 33
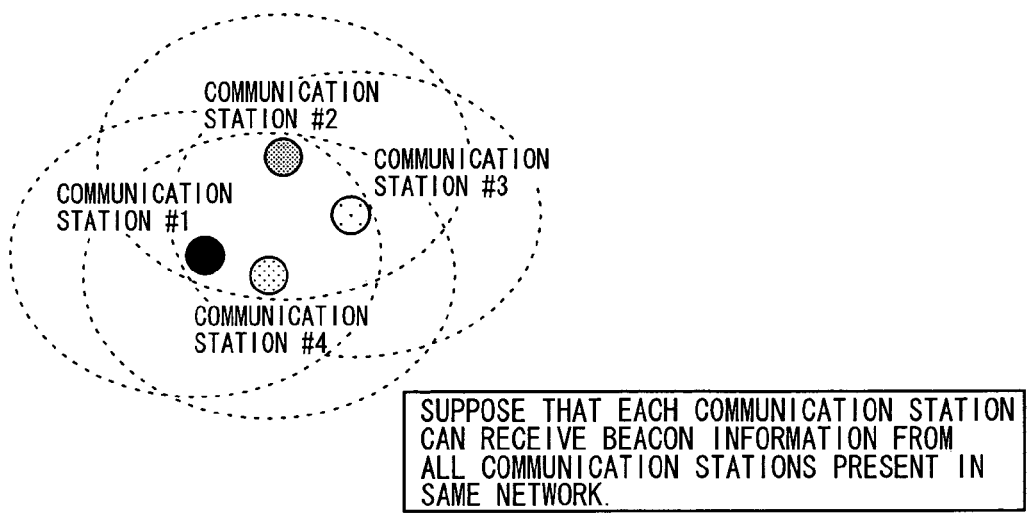
SUPPOSE THAT EACH COMMUNICATION STATION CAN RECEIVE BEACON INFORMATION FROM ALL COMMUNICATION STATIONS PRESENT IN SAME NETWORK.
1. WHEN THERE IS TIMING OF START OF TIME SLOT OF EACH COMMUNICATION STATION AS FOLLOWS,
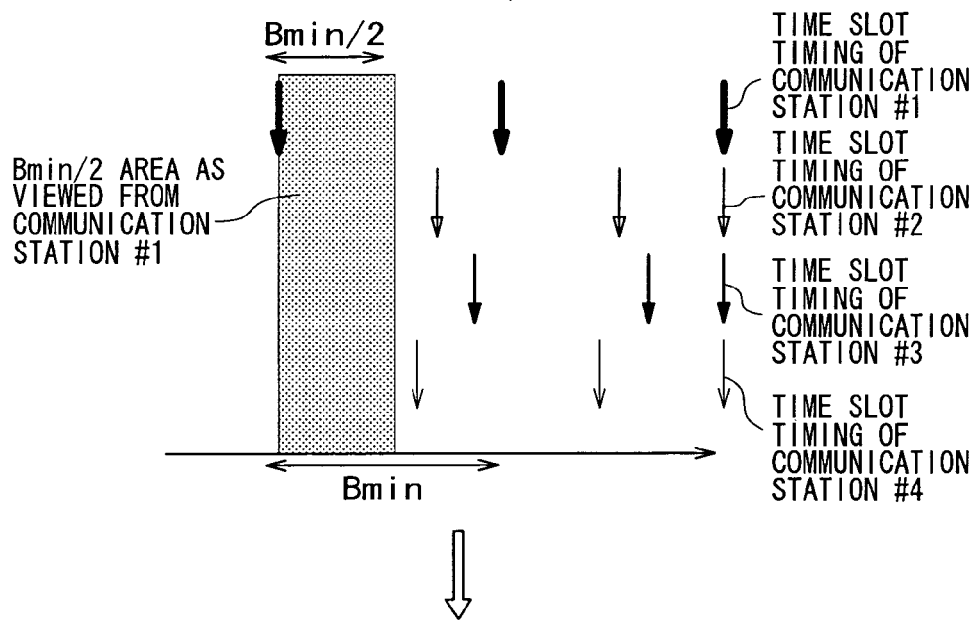
2. COMMUNICATION STATION AS REFERENCE FOR TIME SYNCHRONIZATION FOR COMMUNICATION STATION #1 IS COMMUNICATION STATION #3

WIRELESS COMMUNICATION SYSTEM, WIRELESS COMMUNICATION APPARATUS AND WIRELESS COMMUNICATION METHOD, AND COMPUTER PROGRAM

BACKGROUND OF THE INVENTION

The present invention relates to a wireless communication system, a wireless communication apparatus and a wireless communication method, and a computer program. The wireless communication system communicates with a plurality of radio stations with each other, such as a wireless LAN (Local Area Network) or the like. The present invention particularly relates to a wireless communication system, a wireless communication apparatus and a wireless communication method, and a computer program in which a wireless network is operated by direct communication (random access) between communication stations.

More particularly, the present invention relates to a wireless communication system, a wireless communication apparatus and a wireless communication method, and a computer program in which communication stations perform network operation on an autonomous distributed basis without having a relation of a control station and controlled stations. Particularly, the present invention relates to a wireless communication system, a wireless communication apparatus and a wireless communication method, and a computer program in which communication stations operating on an autonomous basis form an autonomous distributed wireless network without interfering with each other while maintaining synchronization with each other.

Standards for wireless networks include for example IEEE (The Institute of Electrical and Electronics Engineers) 802.11 (see Non-Patent Document 1, for example), HiperLAN/2(see Non-Patent Document 2 and Non-Patent Document 3, for example), IEEE802.15.3, and Bluetooth communication. As to the IEEE802.11 standard, there are extension standards such as IEEE802.11a (see Non-Patent Document 4, for example), IEEE802.11b, IEEE802.11g, and the like for different wireless communication systems and different frequency bands being used, for example.

Generally, in order to form a local area network using radio technology, a method is used in which one apparatus serving as a control station referred to as an "access point" or a "coordinator" is provided within an area and a network is formed under centralized control of the control station.

In wireless networks having an access point disposed therein, an access control method based on band reservation is widely used in which when information is to be transmitted from a communication apparatus, first a band required to transmit the information is reserved at the access point to use a transmission path so as to prevent collision with information transmitted by another communication apparatus. Synchronous wireless communication in which communication apparatuses within a wireless network establish synchronization with each other is performed by disposing the access point.

However, when asynchronous communication is performed between communication apparatuses on a sender side and a receiver side in a wireless communication system having an access point, the wireless communication always needs to be performed via the access point, thus halving efficiency of use of a transmission path.

On the other hand, as another method for forming a wireless network, "ad hoc communication" has been devised in which terminals perform wireless communication with each other directly on an asynchronous basis. For a small-scale wireless network formed by a relatively small number of clients located in the vicinity of each other, ad hoc communication is considered suitable. The ad hoc communication enables arbitrary terminals to perform direct wireless communication, that is, random wireless communication with each other without using a specific access point.

An ad hoc type wireless communication system, which has no central control station, is suitable for forming a home network including household electric appliances, for example. An ad hoc network has for example a feature of resisting failure because routing is automatically changed even when one appliance fails or is turned off, and a feature of being able to transmit data to a relatively long distance while maintaining a high data rate by hopping a packet a plurality of times between mobile stations. Various developed examples of the ad hoc system are known (see Non-Patent Document 5, for example).

For example, IEEE802.11 networking in an IEEE802.11 wireless LAN system is based on a concept of a BSS (Basic Service Set). There are two kinds of BSS: a BSS defined by an "infrastructure mode" in which a master such as an access point (control station) or the like is present, and an IBSS (Independent BSS) defined by an "ad hoc mode" in which the BSS is formed by only a plurality of MTs (Mobile Terminals). In the latter ad hoc mode, the terminals perform peer-to-peer operation on an autonomous distributed basis without a control station being disposed. When a beacon transmission time comes, each terminal counts a random period. When no beacon is received from the other terminals before the period is ended, the terminal transmits a beacon.

Details of conventional wireless networking will be described in the following by taking IEEE802.11 as an example.

Infrastructure Mode

A BSS in the infrastructure mode requires an access point for performing coordination within a wireless communication system. Specifically, the access point groups stations within reach of radio waves in the vicinity of the own station as a BSS to form a so-called "cell" in a cellular system. A mobile station present in the vicinity of the access point is accommodated by the access point, and enters the network as a BSS member.

The access point transmits a control signal referred to as a beacon at appropriate time intervals. A mobile station that can receive the beacon recognizes presence of the access point in the vicinity, and then establishes connection with the access point.

The mobile station in the vicinity of the access point can receive the beacon, decode a TBTT field within the beacon, and recognize a next beacon transmission time. Therefore, in some cases (cases where reception is not required), the mobile station may turn off a receiver to be in a sleep state (to be described later) until a next TBTT or a TBTT after one or more TBTTs.

In the infrastructure mode, only the access point transmits a beacon in a predetermined frame cycle. On the other hand, mobile stations in the vicinity enter the network by receiving the beacon from the access point, and the mobile stations do not transmit a beacon. Incidentally, since the present invention mainly focuses on operating a network without intervention of a master control station such as an access point or the like and is thus not directly related to the infrastructure mode, further description of the infrastructure mode will not be given.

Ad Hoc Mode

IEEE802.11 operation in the other ad hoc mode will be described with reference to FIG. 27.

A plurality of mobile stations in an IBSS in the ad hoc mode negotiates with each other, and then autonomously defines the IBSS. After the IBSS is defined, the mobile station group sets TBTTs at regular intervals after negotiation. When each mobile station recognizes that a TBTT arrives by referring to a clock within the own station, and when the mobile station recognizes that no beacon is transmitted yet after a delay of a random time, the mobile station transmits a beacon.

FIG. 27 shows an example in which two mobile stations form an IBSS. In this case, either one of the mobile stations belonging to the IBSS transmits a beacon each time a TBTT arrives. There is a case of collision between beacons transmitted from the respective mobile stations.

The mobile stations in the IBSS may also go into a sleep state by turning off a transmitter-receiver (to be described later) as required.

Procedure for Transmission and Reception in IEEE802.11

It is generally known that a hidden terminal problem occurs in a wireless LAN network of an ad hoc environment. When communication is performed between specific communication stations, a hidden terminal is a communication station that can be heard by one communication station with which the communication is performed but cannot be heard by another communication station. Since hidden terminals cannot negotiate with each other, there can be a collision in transmission operation.

As a method for solving the hidden terminal problem, CSMA/CA based on an RTS/CTS procedure is known. IEEE802.11 employs this method.

CSMA (Carrier Sense Multiple Access with Collision Avoidance) is a connection system for performing multiple access on the basis of carrier detection. In wireless communication, it is difficult for a communication station to receive an information signal transmitted by the communication station itself. Therefore, by the CSMA/CA (Collision Avoidance) system rather than CSMA/CD (Collision Detection), the communication station checks that no information is transmitted from other communication apparatuses, and then starts transmitting information of the communication station, thus avoiding collision.

In the RTS/CTS system, a communication station as a data sender source transmits a transmission request packet RTS (Request To Send), and then starts transmitting data in response to an acknowledgement packet CTS (Clear To Send) from a communication station as a data transmission destination. Receiving at least one of the RTS and the CTS, a hidden terminal sets a transmission stop period of the own station for expected period to transmit data based on the RTS/CTS procedure to be performed, whereby collision can be avoided. A terminal hidden from a sender station receives a CTS and then sets a transmission stop period to avoid collision between data packets. A terminal hidden from a receiver station receives an RTS and then sets a transmission stop period to avoid collision between ACKs.

Procedure for Transmitting and Receiving Signal in Sleep State

In IEEE802.11 networking, a mobile station in an IBSS at the time of the ad hoc mode may also go into a sleep state by turning off a transmitter-receiver as required.

When the sleep mode is applied in the IBSS of IEEE802.11, a certain period of time from a TBTT is defined as an ATIM (Announcement Traffic Indication Message) window. For the time period of the ATIM window, all mobile stations belonging to the IBSS operate a receiver. During this time period, a mobile station operating in the sleep mode is basically capable of reception.

When each mobile station has information for a destination, the own station transmits an ATIM packet to the communication destination during the time period of the ATIM window, thereby notifying the receiver side that the own station has the information to be transmitted. The mobile station receiving the ATIM packet operates a receiver until reception from the station that transmitted the ATIM packet is ended.

FIG. 28 shows an example in which three mobile stations STA1, STA2, and STA3 are present in an IBSS. When a TBTT arrives, the mobile stations STA1, STA2, and STA3 each operate a back-off timer while monitoring a state of a medium for a random time. In the example shown in FIG. 28, the timer of the mobile station STA1 expires the earliest, and the mobile station STAL transmits a beacon. Since the mobile station STAL transmits the beacon, the mobile station STA2 and the mobile station STA3 receiving the beacon do not transmit a beacon.

In the example shown in FIG. 28, the mobile station STA1 has information for the mobile station STA2, and the mobile station STA2 has information for the mobile station STA3. In this case, after the beacon is transmitted and received, the mobile stations STA1 and STA2 each operate the back-off timer while monitoring a state of the medium for a random time again. In the example shown in FIG. 28, the timer of the mobile station STA2 expires earlier, and the mobile station STA2 transmits an ATIM message to the mobile station STA3. Receiving the ATIM message, the mobile station STA3 gives a feedback indicating the reception of the ATIM message to the mobile station STA2 by transmitting an ACK (Acknowledge) packet.

After the transmission of the ACK is completed, the mobile station STA1 further operates the back-off timer while monitoring a state of the medium for a random time. When the timer expires, the mobile station STA1 transmits an ATIM packet to the mobile station STA2. The mobile station STA2 gives a feedback to the mobile station STA1 by returning an ACK packet indicating the reception of the ATIM packet.

During an interval after the ATIM packets and the ACK packets are exchanged within an ATIM window, the mobile station STA3 operates a receiver to receive information from the mobile station STA2, and similarly the mobile station STA2 operates a receiver to receive information from the mobile station STA1.

After the end of the ATIM window, the mobile station STA1 and the mobile station STA2 having the information to be transmitted each operate the back-off timer while monitoring a state of the medium for a random time. In the example shown in FIG. 28, the timer of the mobile station STA2 expires earlier, and thus the mobile station STA2 first transmits the information to the mobile station STA3. After the transmission of the information is completed, the mobile station STA1 operates the back-off timer while monitoring a state of the medium for a random time again. When the timer expires, the mobile station STA1 transmits a packet to the mobile station STA2.

In the above-described procedure, a communication station receiving no ATIM packet within the ATIM window and a communication station having no information to be transmitted keep a transmitter-receiver turned off until a next TBTT to thereby reduce power consumption.

[Non-Patent Document 1]

International Standard ISO/IEC 8802-11: 1999 (E) ANSI/IEEE Std 802.11, 1999 Edition, Part 11: Wireless LAN Medium Access Control (MAC) and Physical Layer (PHY) Specifications

[Non-Patent Document 2]

ETSI Standard ETSI TS 101 761-1 V1. 3. 1 Broadband Radio Access Networks (BRAN); HIPERLAN Type 2; Data Link Control (DLC) Layer; Part 1: Basic Data Transport Functions

[Non-Patent Document 3]

ETSI TS 101 761-2 V1. 3. 1 Broadband Radio Access Networks (BRAN) HIPERLAN Type 2; Data Link Control (DLC) Layer; Part 2: Radio Link Control (RLC) sublayer

[Non-Patent Document 4]

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band

[Non-Patent Document 5]

C. K. Tho, "Ad Hoc Mobile Wireless Network" (published by Prentice Hall PTR)

As described above, in a wireless communication system in which communication stations perform network operation on an autonomous distributed basis without having a relation of a control station and controlled stations, each communication station makes presence of the communication station itself known to the other communication stations in the neighborhood (that is, within a range of communication) by sending beacon information periodically on a channel, and notifies a network configuration. Since the communication station transmits a beacon at a start of a transmission frame cycle, the transmission frame cycle is defined by a beacon interval. Also, each communication station can detect a beacon signal transmitted from neighboring stations by performing scan operation on the channel for a period corresponding to the transmission frame cycle, and be informed of the network configuration (or enter the network) by decoding information described in the beacon.

In such a wireless communication system, each communication station needs to periodically send beacon information and manage beacon information as described above while maintaining time synchronization with the neighboring stations. Also, in an access method based on time synchronization in which the communication station reserves a band or sets a priority use period within a frame cycle, for example, it is very important for communication stations to maintain time synchronization with each other.

In many of conventional wireless communication systems requiring time synchronization, each communication station establishes time synchronization with a neighboring station through intervention of a control station, and thereby time synchronization can be established between communication stations present in the same network.

On the other hand, since a wireless communication system in which communication stations perform network operation on an autonomous distributed basis does not have a relation of a control station and controlled stations, a conventional method of establishing time synchronization cannot be applied to such a wireless communication system. For example, in the wireless communication system of the autonomous distributed type, a method is conceivable which temporarily defines a master-slave relation between communication stations and thus creates a communication station temporarily serving as a control station within the same network, whereby a conventional method is applied to establish time synchronization. However, processes for determining the master and the slave and for resetting the master when the master disappears from the network are complicated.

Since each communication station in ad hoc communication has a greater process load than in infrastructure communication performed via an access point or the like, further increase in the process load is not desirable. Thus, the autonomous distributed type communication system requires techniques that enable time synchronization to be established between communication stations by a relatively simple process.

SUMMARY OF THE INVENTION

The present invention has been made in view of technical problems as described above, and it is a main object of the present invention to provide a wireless communication system, a wireless communication apparatus and a wireless communication method, and a computer program that are excellent in enabling communication stations to suitably perform network operation on an autonomous distributed basis without having a relation of a controlling station and controlled stations.

It is another object of the present invention to provide a wireless communication system, a wireless communication apparatus and a wireless communication method, and a computer program that are excellent in enabling autonomously operating communication stations to form an autonomous distributed wireless network without interfering with each other while maintaining synchronization with each other.

It is a further object of the present invention to provide a wireless communication system, a wireless communication apparatus and a wireless communication method, and a computer program that are excellent in enabling communication stations in an autonomous distributed wireless network to achieve time synchronization with other communication stations by a relatively simple low-load process.

The present invention has been made in view of the above problems. According to a first aspect of the present invention, a wireless communication system is constructed by autonomous distributed operation of communication stations without having a relation of a controlling station and controlled stations. Each communication station checks a state of time synchronization with a neighboring station, determines whether the time synchronization needs to be corrected, and carries out one of methods of surely performing a time synchronization correcting process and performing the correcting process with a predetermined probability when the time synchronization needs to be corrected.

When the time synchronization needs to be corrected, the communication station estimates a parameter indicating a difference in synchronization timing from the neighboring station, determines a communication station as a reference for time synchronization on a basis of the estimated parameter, and achieves time synchronization with the communication station as the reference.

The "system" in this case refers to a logical combination of a plurality of apparatus (or function modules realizing specific functions), and the apparatus or the function modules are not particularly required to be within a single enclosure.

In the wireless communication system according to the present invention, no particular coordinator is disposed. Each communication station makes presence of the communication station itself known to other communication stations in the neighborhood (that is, within a range of communication) by sending beacon information, and notifies a network configuration. A new communication station entering a range of communication of a certain communication station detects the entry of the new communication station into the range of communication by receiving a beacon signal, and can be informed of the network configuration by decoding information described in the beacon.

When there is no communication station in the vicinity, a communication station can start transmitting a beacon in appropriate timing. Thereafter a new communication station entering the range of communication sets timing of transmission of a beacon of the communication station itself such that the beacon does not collide with existing beacons in beacon arrangement. At this time, since each communication station obtains a priority use area immediately after transmission of a beacon, for example, the beacon is arranged according to an algorithm in which beacon transmission timing of a newly entering station is sequentially set to timing in substantially the middle of a beacon interval set by existing communication stations.

In the wireless communication system, each communication station needs to periodically send beacon information and manage beacon information as described above while maintaining time synchronization with neighboring stations. Also, in an access method based on time synchronization in which each communication station reserves a band or sets a priority use period within a frame cycle, for example, it is important to maintain time synchronization.

In a wireless communication system controlled by a specific controlling station, each communication station establishes time synchronization with a neighboring station through intervention of a control station, and thereby time synchronization can be established between communication stations present in the same network. On the other hand, since an autonomous distributed type wireless communication system without a relation of a control station and controlled stations does not have a communication station serving as a controlling station, such a method of establishing time synchronization cannot be applied to the autonomous distributed type wireless communication system.

Accordingly, in the present invention, each communication station operating on an autonomous distributed basis estimates a parameter indicating a difference in synchronization timing from a neighboring station, determines a communication station as a reference for time synchronization on a basis of the estimated parameter, and achieves time synchronization with the communication station as the reference. Thereby time synchronization is established with all communication stations present within the same network.

Specifically, time slot start timing of another station with respect to time clock timing of the own station is estimated from a time of reception of a packet periodically exchanged between communication stations such as a beacon signal. Then, a time slot of the own station is synchronized with a communication station having the most delayed time slot start timing within a time interval, whereby time synchronization is achieved between communication stations within the same network on an autonomous distributed basis.

When a deviation occurs from intended timing of transmission of a beacon due to mixture with another network or entry of a new communication station, for example, since a neighboring station estimates time slot start timing of another station from a time of reception of the beacon, the neighboring station may estimates time slot timing different from real timing, and consequently cause a time synchronization deviation.

Accordingly, a flag indicating whether the beacon is transmitted at an intended time may be added to beacon information. In such a case, the station receiving the beacon refers to the flag and reduces frequency of synchronizing with incorrectly estimated time slots, and thus time synchronization can be maintained within a network with reliability.

With the above-described time synchronization establishing method based on estimation of difference in cycle timing from a neighboring station, when a state continues in which a communication station out of time synchronization with a neighboring station cannot transmit a beacon at an intended time, there is a possibility that neither of the own station and the neighboring station performs time slot correction. Consequently, a state of time synchronization deviation continues indefinitely.

Accordingly, in the present invention, when the state continues in which the own station cannot transmit the beacon at the intended time, and when a time synchronization deviation from the neighboring station is detected, even if time slot start timing of the own station is most delayed as compared with the neighboring station within a certain time interval, the own station is synchronized with time slot timing of another station. This process may be performed to prevent a state of time synchronization deviation from continuing.

In the case where the time synchronization correction process as described above is applied, when a plurality of communication stations are to correct time synchronization deviation in the same timing coincidentally, convergence may not be achieved to establish time synchronization. When it is repeated in a steady pattern, time synchronization conversion may not be achieved indefinitely.

Accordingly, in the present invention, when a time synchronization deviation is detected, a communication station performs a probabilistic process so as to prevent a steady pattern from occurring in timing of correction of time synchronization with neighboring stations. This process may be performed to avoid the problem of convergence in correcting time synchronization not being achieved.

An intermittent reception mode in which a communication station that is not transmitting or receiving data to or from neighboring stations performs data reception for only a certain interval and performs only beacon transmission during other times has been introduced in many wireless network systems for a purpose of reducing power consumption. However, when the time slot timing of the own station is corrected with a probability as described above, since an intermittently receiving communication station in particular has a long period of time before a next time synchronization process because of the intermittent reception, it may take a long time before time synchronization is corrected.

Accordingly, in a method of a time synchronization process with an intermittently receiving communication station taken into consideration, consideration is given so that the intermittently receiving communication station performs the time synchronization process earlier than a normal communication station in correction of time slot timing of the own station which correction is performed with a probability $\alpha (0<\alpha<1)$. Further, a threshold value may be provided for a time from detection of a time synchronization deviation to correction of time synchronization to prevent lengthening of the time from the detection of the time synchronization deviation to the correction of the time synchronization deviation, which can be a problem in an intermittently receiving communication station in particular.

When beacon transmission and reception at other than intended times continue, and when an error in time synchronization timing is estimated and neighboring stations continue to mutually perform correction, the time synchronization deviation may continue to be detected for an indefinite time. In the case where each communication station operating on an autonomous distributed basis determines a communication station as a reference for time synchronization on a basis of an estimated parameter indicating a difference in synchronization timing from a neighboring station and then achieves time synchronization, when the synchronization timing difference of each communication station coincides precisely with a value for determining the reference station, there is a possibility that neither of the communication stations performs a time synchronization correction process.

Accordingly, when a time synchronization deviation continues, or when beacon transmission and reception at other than intended times continues, even if it is determined as a result of the estimation of the parameter indicating the difference in synchronization timing from the neighboring station that time synchronization with the neighboring station is not required to be achieved, the time synchronization correction process may be performed with a predetermined probability. Thereby, at the time of a network environment and even at the time of steady occurrence of the time synchronization correction process in which a time synchronization deviation continues to occur, it is possible to establish time synchronization. For example, a communication station that determines first that the time synchronization correction process is required corrects time synchronization to synchronize with time slot timing of another communication station.

According to a second aspect of the present invention, a computer program is described in a computer readable form so as to perform a process on a computer system for operating in a wireless communication environment in which a particular controlling station is not disposed. The computer program includes an estimating step for estimating a parameter indicating a difference in synchronization timing from a neighboring station, and a synchronization achieving step for determining a communication station as a reference for time synchronization on a basis of the estimated parameter, and achieving time synchronization with the communication station as the reference.

The computer program according to the second aspect of the present invention is a definition of a computer program described in a computer readable form so as to implement a predetermined process on a computer system. In other words, the computer program is installed according to the second aspect of the present invention, and a cooperative action is exerted on the computer system, which thus operates as a wireless communication apparatus. A wireless network is constructed by starting a plurality of such wireless communication apparatus, and similar effects to those of the wireless communication system according to the first aspect of the present invention can be obtained.

According to the present invention, it is possible to provide a wireless communication system, a wireless communication apparatus and a wireless communication method, and a computer program that are excellent in enabling communication stations to suitably perform network operation on an autonomous distributed basis without a controlling station being disposed.

Also, according to the present invention, it is possible to provide a wireless communication system, a wireless communication apparatus and a wireless communication method, and a computer program that are excellent in enabling autonomously operating communication stations to form an autonomous distributed wireless network without interfering with each other while maintaining synchronization with each other.

According to the present invention, each communication station operating on an autonomous distributed basis estimates a parameter indicating a difference in synchronization timing from a neighboring station, determines a communication station as a reference for time synchronization on a basis of the estimated parameter, and achieves time synchronization with the communication station as the reference. Thereby time synchronization can be established between all communication stations present within the same network.

Thus, according to the present invention, it is possible to readily employ an access method based on time synchronization in an ad hoc network.

In addition, the present invention eliminates a need for performing system design with consideration given to a process when an access point or a controlling station disappears, unlike a wireless communication system requiring time synchronization depending on an access point, a controlling station for managing time synchronization, or the like. Further, a load of the synchronization process on each communication station can be reduced, and therefore power consumption attendant on the synchronization process can be reduced.

Further, according to the present invention, even when a plurality of networks are mixed with each other, time synchronization between the networks can be readily achieved. It is therefore possible to construct an ad hoc network with excellent connectability.

Other and further objects, features, and advantages of the present invention will become apparent from more detailed description in the following on the basis of embodiments of the present invention and the accompanying drawings.

BRIEF DESCRIPTION OF THE DRAWINGS

FIG. 4 is a diagram showing an example of a format of a beacon frame;

FIG. 5 is a diagram showing an example of an NBOI description;

FIG. 6 is a diagram showing a relation between a TBTT and an actual beacon transmission time;

FIG. 14 is a diagram of assistance in explaining a beacon transmitting procedure of communication stations;

FIG. 15 is a diagram of assistance in explaining a method of estimating timing of a start of a super frame of a neighboring station;

FIG. 16 is a diagram of assistance in explaining a procedure for determining a communication station as a reference for time synchronization and establishing time synchronization;

FIG. 17 is a diagram of assistance in explaining a procedure for determining a communication station as a reference for time synchronization and establishing time synchronization;

FIG. 18 is a flowchart of a process procedure performed until a communication station as a reference is determined from estimated time slot timing of a neighboring station;

FIG. 19 is a diagram of assistance in explaining a procedure for establishing time synchronization when there are a plurality of communication stations to serve as a reference for time synchronization;

FIG. 21 is a diagram of assistance in explaining a method for achieving time synchronization for entering while synchronous relation in the existing network is maintained only at the time of the new entry;

FIG. 22 is a diagram of assistance in explaining an operation procedure for establishing time synchronization between communication stations when another network is mixed;

FIG. 24 is a diagram of assistance in explaining a procedure for performing a probabilistic process so as to prevent occurrence of a steady pattern in timing of correction of time synchronization with neighboring stations when time synchronization deviation is detected;

FIG. 26 is a flowchart of a synchronization process procedure with an intermittently receiving communication station taken into consideration;

FIG. 27 is a diagram of assistance in explaining IEEE802.11 operation at the time of an ad hoc mode;

FIG. 31 is a diagram showing an example of a network environment in which time synchronization is not achieved indefinitely;

FIG. 32 is a flowchart of a method for achieving synchronization with emphasis placed on shortening of a time required to correct time synchronization;

FIG. 33 is a diagram showing an example of a network environment where a plurality of communication stations are in the vicinity of each other.

DETAILED DESCRIPTION OF PREFERRED EMBODIMENTS

Preferred embodiments of the present invention will hereinafter be explained in detail with reference to the drawings.

A propagation path in communication assumed in the present invention is a wireless path, and a network is constructed between a plurality of communication stations. The communication assumed in the present invention is store and forward type traffic, in which information is transferred in packet units. Also, while description below assumes a single channel for communication stations, the present invention can be extended to a case where a transmission medium including a plurality of frequency channels, that is, a multi-channel is used.

In a wireless network according to the present invention, communication stations can transmit information directly (randomly) to each other according to an access procedure based on CSMA (Carrier Sense Multiple Access), and thereby construct a wireless network of an autonomous distributed type.

Also, in a wireless network according to the present invention, transmission control using channel resources effectively is performed by transmission (MAC) frames having a loose time division multiple access structure. In this case, each communication station can carry out an access method based on time synchronization, in which a band is reserved or a priority use period is set, for example.

One embodiment of the present invention assumes for example IEEE802.11a as an extension standard of IEEE802.11 for a communication environment.

In such a wireless communication system having no relation of a control station and controlled stations, each communication station makes presence of the communication station itself known to other communication stations in the neighborhood (that is, within a range of communication) by sending beacon information, and notifies a network configuration. A new communication station entering a range of communication of a certain communication station detects entry of the new communication station into the range of communication by receiving a beacon signal, and can be informed of the network configuration by decoding information described in the beacon.

Processes in each communication station to be described below are basically performed by all communication stations in the network. In some cases, however, not all communication stations composed of a network perform the processes to be described below.

A. Apparatus Configuration

Figure 1:
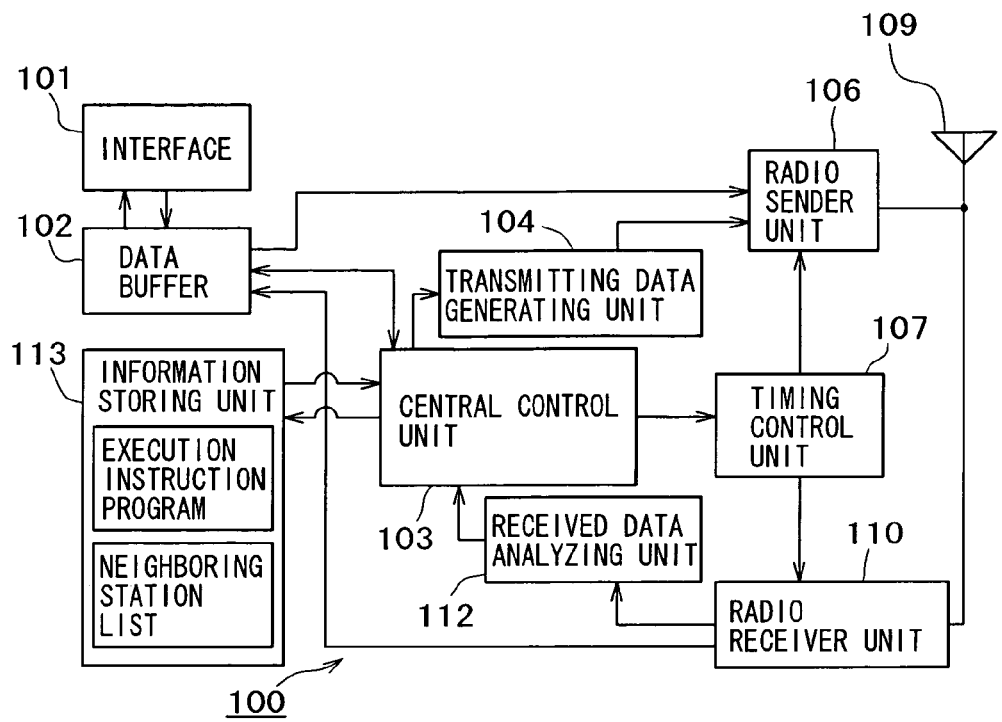
FIG. 1 is a diagram schematically showing a functional configuration of a wireless communication apparatus operating as a communication station in a wireless network according to one embodiment of the present invention.

FIG. 1 schematically shows a functional configuration of a wireless communication apparatus operating as a communication station in a wireless network according to one embodiment of the present invention. Wireless communication apparatuses 100 as shown in FIG. 1 can form a network while avoiding collision by making effective channel access within the same wireless system.

As shown in FIG. 1, the wireless communication apparatus 100 includes an interface 101, a data buffer 102, a central control unit 103, a transmitting data generating unit 104, a radio sender unit 106, a timing control unit 107, an antenna 109, a radio receiver unit 110, a received data analyzing unit 112, and an information storing unit 113.

The interface 101 exchanges various information with an external apparatus (for example a personal computer (not shown)) connected to the wireless communication apparatus 100.

The data buffer 102 is used to temporarily store data sent from the apparatus connected via the interface 101 and data received via a radio transmission path before sending the received data via the interface 101.

The central control unit 103 manages a series of information transmission and reception processes in the wireless communication apparatus 100 and controls access to a transmission path in a centralized manner. Basically, the central control unit 103 performs an access control in which on the basis of a CSMA procedure, the central control unit 103 operates a back-off timer for a random time while monitoring a state of the transmission path and obtains a transmission right when there is no signal transmitted during this time.

In the present embodiment, the central control unit 103 periodically notifies beacon information and manages beacon information, for example, and thereby realizes transmission control using channel resources effectively by transmission (MAC) frames having a loose time division multiple access structure. Also, in order to avoid collision of beacons by autonomous communication operation of the wireless communication apparatus 100, the central control unit 103 manages a network on the basis of a neighboring station list (Neighboring List). In addition, to realize an access method based on time synchronization in which for example a band is reserved or a priority use period is set within a super frame, the central control unit 103 performs a process for achieving time synchronization between communication stations. The process of achieving time synchronization is performed by estimating time slot start timing of each neighboring station with respect to time clock timing of the own station from a time of reception of a packet from the neighboring station, determining a communication station to serve as a reference for time synchronization on the basis of a result of the estimation, and achieving time synchronization with the reference communication station. The achievement of time synchronization will be explained later in detail.

The transmitting data generating unit 104 generates a packet signal and a beacon signal to be transmitted from the own station to a neighboring station. Packets in this case includes not only data packets but also a transmission request packet RTS for a receiving communication station, an acknowledgement packet CTS in response to the RTS, an ACK packet, and the like. For example, a data packet is generated by cutting out a predetermined length of transmitted data stored in the data buffer 102 and setting the predetermined length of data as a payload.

The radio sender unit 106 for example includes: a modulator for modulating a transmitting signal by a predetermined modulation method such as OFDM (Orthogonal Frequency Division Multiplexing) or the like; a D/A converter for converting a digital transmitting signal into an analog signal; an up converter for subjecting the analog transmitting signal to a frequency conversion and thereby up-converting the analog transmitting signal; and a power amplifier (PA) for amplifying power of the up-converted transmitting signal (none of these components are shown). The radio sender unit 106 performs a process of radio transmission of a packet signal at a predetermined transmission rate.

The radio receiver unit 110 for example includes: a low noise amplifier (LNA) for subjecting a signal received from another station via the antenna 109 to voltage amplification; a down converter for down-converting the received signal subjected to the voltage amplification by a frequency conversion; an automatic gain controller (AGC); an A/D converter for converting the analog received signal into a digital signal; and a demodulator for performing a demodulation process by a synchronization process for achieving synchronization, channel estimation, and a demodulation method such as OFDM or the like (none of these components are shown).

The antenna 109 transmits a signal to another wireless communication apparatus by radio on a predetermined frequency channel, or collects a signal transmitted from another wireless communication apparatus. In the present embodiment, the antenna 109 has a single antenna, and is not able to perform both of transmission and reception in parallel with each other.

The timing control unit 107 controls timing for transmitting and receiving radio signals. For example, the timing control unit 107 controls timing of packet transmission of the timing control unit 107 and timing of transmission of packets (such for example as RTS, CTS, data, and ACK packets) in accordance with an RTS/CTS method (setting of a frame interval IFS from reception of an immediately preceding packet to transmission of a packet by the station and back-off at a time of transmission contention, for example), sets NAV at the time of reception of a packet directed to another station, and controls timing of beacon transmission and reception and the like.

The received data analyzing unit 112 analyzes a beacon signal and a packet signal received from another station (including analysis of RTS and CTS signals).

The information storing unit 113 stores execution procedure instruction programs for a series of access control operations performed in the central control unit 103, and the like, and stores information obtained from results of analysis of received packets and beacons, and the like. For example, information on neighboring apparatus (NBOI (to be described later) and a neighboring station list) obtained by analyzing beacons is stored in the information storing unit 113, and is used as required in communication operation control of timing of sender and receiver operation or the like and a beacon generating process.

B. Construction of Autonomous Distributed Network on Basis of Exchange of Beacon Information In an autonomous distributed type network according to the present embodiment, each communication station makes presence of the communication station itself known to other communication stations in the neighborhood (that is, within a range of communication) by sending beacon information on a predetermined channel at predetermined time intervals, and notifies a network configuration. A transmission frame cycle in which a beacon is transmitted is defined as a "Super Frame" in the present specification. Suppose that one super frame is 40 milliseconds, for example.

A new communication station entering the network can detect entry of the communication station into a range of communication by hearing a beacon signal from a neighboring station by scan operation, and be informed of the network configuration by decoding information described in the beacon. Then, while slowly performing synchronization with timing of reception of the beacon, the communication station sets timing of transmission of a beacon of the own station to timing in which no beacon is transmitted from the neighboring station.

In the wireless network according to the present embodiment, communication stations transmit information directly (randomly) to each other according to an access procedure based on CSMA, while the communication stations achieve time synchronization with each other by sending beacons, and perform transmission control using channel resources effectively by transmission (MAC) frames having a loose time division multiple access structure. In this case, each communication station can carry out an access method based on time synchronization, in which a band is reserved or a priority use period is set, for example.

A beacon transmission procedure of each communication station according to the present embodiment will be described with reference to FIG. 2.

Each communication station performs synchronization slowly while hearing beacons transmitted in the vicinity. When a new communication station appears, the new communication station sets timing of transmission of a beacon of the new communication station such that the timing of transmission of the beacon of the new communication station does not coincide with timing of transmission of beacons of existing communication stations.

When there is no communication station in the vicinity, a communication station 01 can start transmitting a beacon in appropriate timing. A transmission interval between beacons is 40 milliseconds. In an example shown in a top stage in FIG. 2, B01 denotes a beacon transmitted from the communication station 01.

Thereafter a new communication station entering a range of communication sets timing of transmission of a beacon of the communication station itself such that the beacon does not collide with existing beacons in beacon arrangement.

Figure 2:
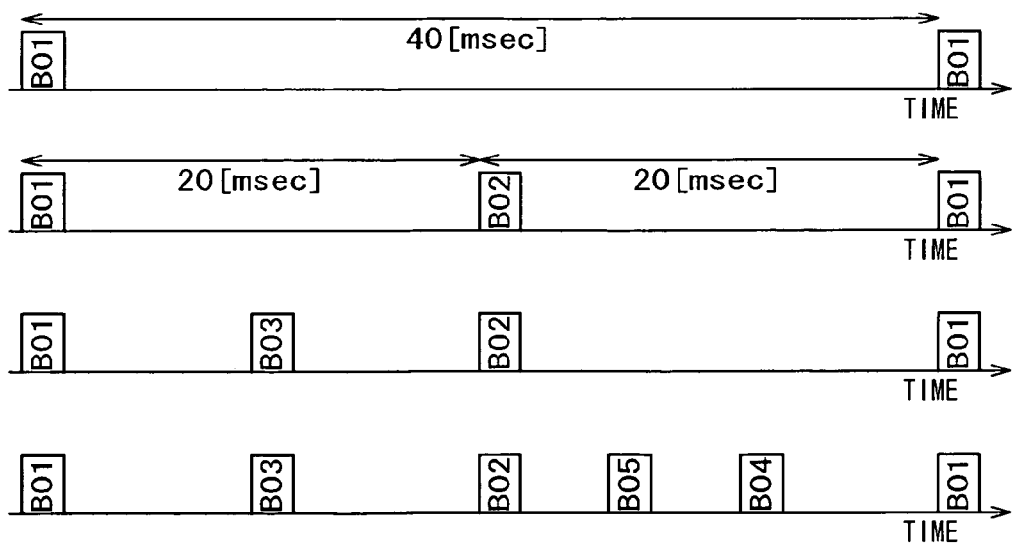
FIG. 2 is a diagram of assistance in explaining a procedure for beacon transmission and reception of each communication station in an autonomous distributed type network.

For example, suppose that a new communication station 02 appears on a channel where only the communication station 01 is present as shown in the top stage in FIG. 2. At this time, the communication station 02 recognizes presence and a beacon position of the communication station 01 by receiving a beacon from the communication station 01. The communication station 02 sets timing of transmission of a beacon of the communication station 02 such that the beacon of the communication station 02 does not collide with the beacon of the communication station 01 as shown in a second stage in FIG. 2, and then starts transmitting the beacon.

Further, suppose that a new communication station 03 appears. At this time, the communication station 03 receives at least one of the beacons transmitted from the communication station 01 and the communication station 02, respectively, and recognizes presence of these existing communication stations. Then, as shown in a third stage in FIG. 2, the communication station 03 starts transmitting a beacon in timing in which the beacon does not collide with the beacons transmitted from the communication station 01 and the communication station 02.

Thereafter, beacon intervals are shortened according to a similar algorithm each time a new communication station enters the neighborhood. As shown in a bottom stage in FIG. 2, a communication station 04 appearing next sets timing of transmission of a beacon of the communication station 04 such that the timing of transmission of the beacon of the communication station 04 does not coincide with the beacon transmission timing set by each of the communication station 01, the communication station 02, and the communication station 03. Further, a communication station 05 appearing next sets timing of transmission of a beacon of the communication station 05 such that the timing of transmission of the beacon of the communication station 05 does not coincide with the beacon transmission timing set by each of the communication station 01, the communication station 02, the communication station 03, and the communication station 04.

However, in order to prevent a band (super frame) from being filled with too many beacons, a minimum beacon interval $B_{min}$ is defined, and timing of transmission of two or more beacons arranged within $B_{min}$ is not allowed. For example, when the minimum beacon interval $B_{min}$ is defined as 625 microseconds in a super frame of 40 milliseconds, only up to 64 communication stations can be accommodated within reach of radio waves.

When a new beacon is disposed within a super frame, each communication station obtains a priority use area (TPP) immediately after transmitting a beacon (to be described later). Therefore, equal distribution of timings of transmission of beacons of communication stations within a super frame cycle is desirable rather than the timings being close to each other on one channel from a viewpoint of transmission efficiency. However, in order to equally distribute timings of beacon transmission, for example, timing of transmission of a beacon of a communication station may be determined so as to start transmitting the beacon in substantially the middle of a time period of a longest beacon interval within a range of hearing of the communication station. In that case, since a neighboring station determines beacon transmission timing by a similar method, the frequency of collision between the beacon transmitted from the neighboring station and the beacon of the communication station may be increased. Therefore, in the present embodiment, the beacon transmission timing of the communication station is set appropriately so as not to coincide with timings of beacons transmitted from neighboring stations.

Figure 3:
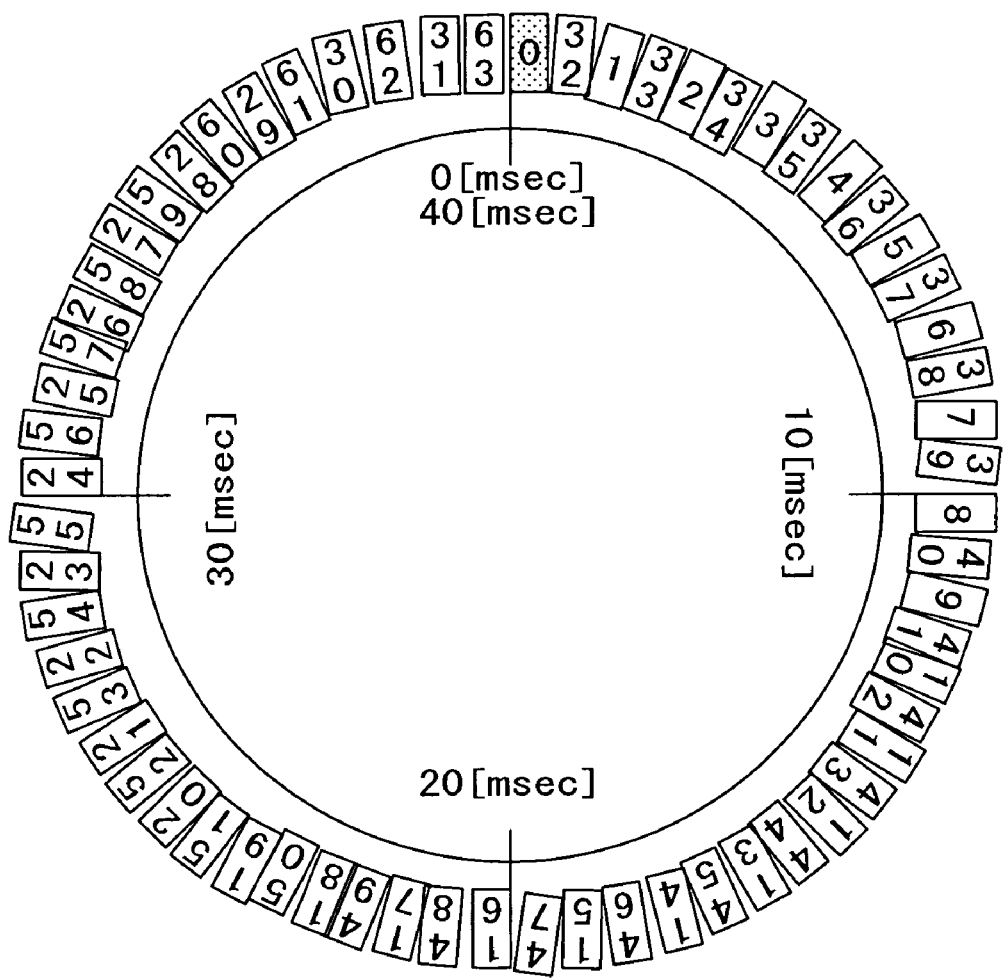
FIG. 3 is a diagram showing an example of configuration of beacon transmission timings (TBTT) that can be set within a super frame.

FIG. 3 shows an example of configuration of beacon transmission timings (TBTT) that can be set within a super frame. A position where a beacon can be disposed is also referred to as a "slot." In the example shown in FIG. 3, the passage of time in a super frame of 40 milliseconds is represented as by a clock having an hour hand turned clockwise on an annular ring.

Incidentally, though not clearly shown in FIG. 2 and FIG. 3, each beacon is transmitted at a time having a slight intentional time offset from a TBTT (Target Beacon Transmission Time), which is a time of transmission of the beacon. This offset is referred to as a "TBTT offset." In the present embodiment, a pseudorandom number determines a TBTT offset value. This pseudorandom number is determined by a uniquely set pseudorandom sequence TOIS (TBTT Offset Indication Sequence), and the TOIS is updated for each super frame.

The TBTT offset allows actual beacon transmission times to be shifted from each other even when two communication stations set beacon transmission timing in the same slot in a super frame. Even when beacons collide with each other in a super frame, each communication station can hear the beacon of the other communication station in another super frame (or neighboring communication stations hear both beacons). The communication stations send beacon information including the TOIS set for each super frame to neighboring stations (to be described later).

In the present embodiment, when transmitting or receiving no data, each communication station is required to perform receiver operation before and after a beacon transmitted by the own station. In addition, even when transmitting or receiving no data, each communication station is required to perform scan operation by continuously operating a receiver for one super frame once in a few seconds to check for change in presence of beacons in the vicinity or for a shift in the TBTT of each neighboring station. The communication station identifies a TBTT shift, defining the TBTT shifted within $-B_{min}/2$ milliseconds with reference to a TBTT group recognized by the communication station as "advanced" and defining the TBTT shifted within $B_{min}/2$ milliseconds as "delayed". The communication station corrects time so as to be adjusted to the most delayed TBTT. Incidentally, details of such a method for achieving synchronization of time slot timing with neighboring stations will be described later.

FIG. 4 shows an example of a format of a beacon frame transmitted in an autonomous distributed type wireless communication system according to the present embodiment.

In the example of FIG. 4, the beacon for example includes a TA (transmitter Address) field, a Type field, an NBOI/NBAI (Neighboring Beacon Offset Information/Neighboring Beacon Activity Information) field, a TOIS (TBTT Offset Indication Sequence) field, an ALERT field, a TxNum field, and a Serial field. The TA filed has an address uniquely identifying a station as a sender source. The Type field indicates a type of the beacon in question. The NBOI/NBAI field has information on times of reception of beacons receivable from neighboring stations. The TOIS field has information indicating a TBTT offset value (described above) in a super frame in which the beacon in question is transmitted. The ALERT field stores information on TBTT change and various other information to be transmitted. The TxNum field indicates an amount of resources preferentially secured by the communication station in question. The Serial field indicates exclusive unique serial numbers assigned to a plurality of beacons when the beacons are transmitted in the super frame in question.

The Type field describes the type of the beacon in question in a bit map format of an 8-bit length. The present embodiment represents information for distinguishing whether a beacon is a "regular beacon" or an "auxiliary beacon by using a value in a range of 0 to 255; indicating a priority. The regular beacon is transmitted by each communication station only once at a start of each super frame. The auxiliary beacon is transmitted to obtain a preferential transmission right. Specifically, a regular beacon required to be transmitted once in each super frame is assigned 255 indicating the highest priority, and an auxiliary beacon is assigned one of values of 0 to 254 corresponding to a traffic priority.

The NBOI field has information describing positions (reception times) of beacons, which are receivable by the own station within a super frame, of adjacent stations. In the present embodiment, since slots allowing a maximum of 64 beacons to be arranged therein within one super frame are provided as shown in FIG. 3, the NBOI field describes information on the arrangement of receivable beacon slots in a bit map format of an 64-bit length. Specifically, a time TBTT of transmission of a regular beacon of the own station is mapped to a first bit (MSB) of the NBOI field, and the other slots are mapped to bit positions corresponding to relative positions (offsets) with respect to the TBTT of the own station. Then, 1 is written to bit positions assigned to slots of beacons transmitted by the own station and beacons receivable by the own station, and the other bit positions remain 0.

FIG. 5 shows an example of an NBOI description. While the NBOI constitutes 64 bits corresponding to the number of beacons that can be arranged within a super frame, suppose in this case for simplicity of the drawing that communication stations 0 to F respectively set TBTTs in slots that can accommodate a maximum of 16 stations. In the example shown in FIG. 5, the communication station 0 has created an NBOI field of "1100, 0000, 0100, 0000." This field indicates that the communication station 0 "can receive beacons from the communication station 1 and the communication station 9." When beacons are receivable, a mark is assigned to NBOI bits corresponding to relative positions of the receivable beacons, and when a beacon is not received, a space is assigned. The MSB is 1 because the own station transmits the beacon. A position corresponding to a time of transmission of the beacon by the own station is also marked.

When receiving a beacon signal from another communication station on a channel, each communication station can set timing of transmission of a beacon of the communication station itself while avoiding beacon collision on the channel and detect timing of reception of beacons from neighboring stations on the basis of the NBOI description included in the beacon signal.

The NBAI field has the same format as the NBOI field. The NBAI field describes information for identifying beacons actually received by the own station.

The TOIS field stores a pseudorandom sequence that determines the above-described TBTT offset, and thus indicates the TBTT offset of the transmitted beacon in question. The TBTT offset allows actual beacon transmission times to be shifted from each other even when two communication stations set beacon transmission timing in the same slot in a super frame. Even when beacons collide with each other in a super frame, each communication station can hear the beacon of the other communication station in another super frame (or neighboring communication stations hear both beacons).

FIG. 6 shows a TBTT and an actual beacon transmission time. When the TBTT offset is defined such that the actual beacon transmission time is one of the TBTT, the TBTT+20 microseconds, the TBTT+40 microseconds, the TBTT+60 microseconds, the TBTT+80 microseconds, the TBTT+100 microseconds, and the TBTT+120 microseconds as shown in FIG. 6, the TBTT offset for transmission is determined and the TOIS is updated in each super frame. When the sender station cannot transmit the beacon at an intended time, all zeros or the like is stored in the TOIS to notify neighboring stations, which can receive the beacon, that the transmission of the beacon this time is not performed at the intended time.

The ALERT field stores information to be transmitted to neighboring stations at the time of an abnormal state. For example, when the own station intends to change the TBTT of the regular beacon of the own station to avoid beacon collision or the like, or when the station requests neighboring stations to stop transmission of auxiliary beacons, it is described in the ALERT field.

The TxNum field describes the number of auxiliary beacons transmitted by the station in question within a super frame. Since a communication station is given a TPP, that is, a preferential transmission right after transmitting a beacon (to be described later), the number of auxiliary beacons within a super frame corresponds to a ratio of time when transmission is performed while resources are preferentially secured.

In the Serial field, exclusive unique serial numbers assigned to a plurality of beacons when the beacons are transmitted in the super frame in question are written. As the serial numbers of the beacons, exclusive unique numbers are entered in the respective beacons transmitted within the super frame. In the present embodiment, information indicating positions of TBTTs at which the auxiliary beacons are transmitted with reference to the regular beacon of the own station is described.

In addition, an ETC field is provided to describe information other than the above.

After turning on power, a communication station first performs scan operation, that is, signal reception continuously for a length of a super frame or more to check for presence of beacons transmitted by neighboring stations. When receiving no beacons from neighboring stations in this process, the communication station sets appropriate timing as a TBTT.

When receiving beacons transmitted from neighboring stations, on the other hand, the communication station shifts the NBOI field of each of the beacons received from the neighboring stations according to a time of reception of the beacon, obtains a logical sum (OR) of the NBOIs, and refers to the logical sum (OR) of the NBOIs. Thereby the communication station finally extracts a beacon transmission timing from timings corresponding to unmarked bit positions.

After obtaining the OR of the NBOIs obtained from the beacons received from the neighboring stations, the communication station determines the beacon transmission timing from space parts.

When a TBTT interval as the longest space run length is shorter than the minimum TBTT interval (that is, less than $B_{min}$), the new communication station cannot enter this system.

Figure 7:
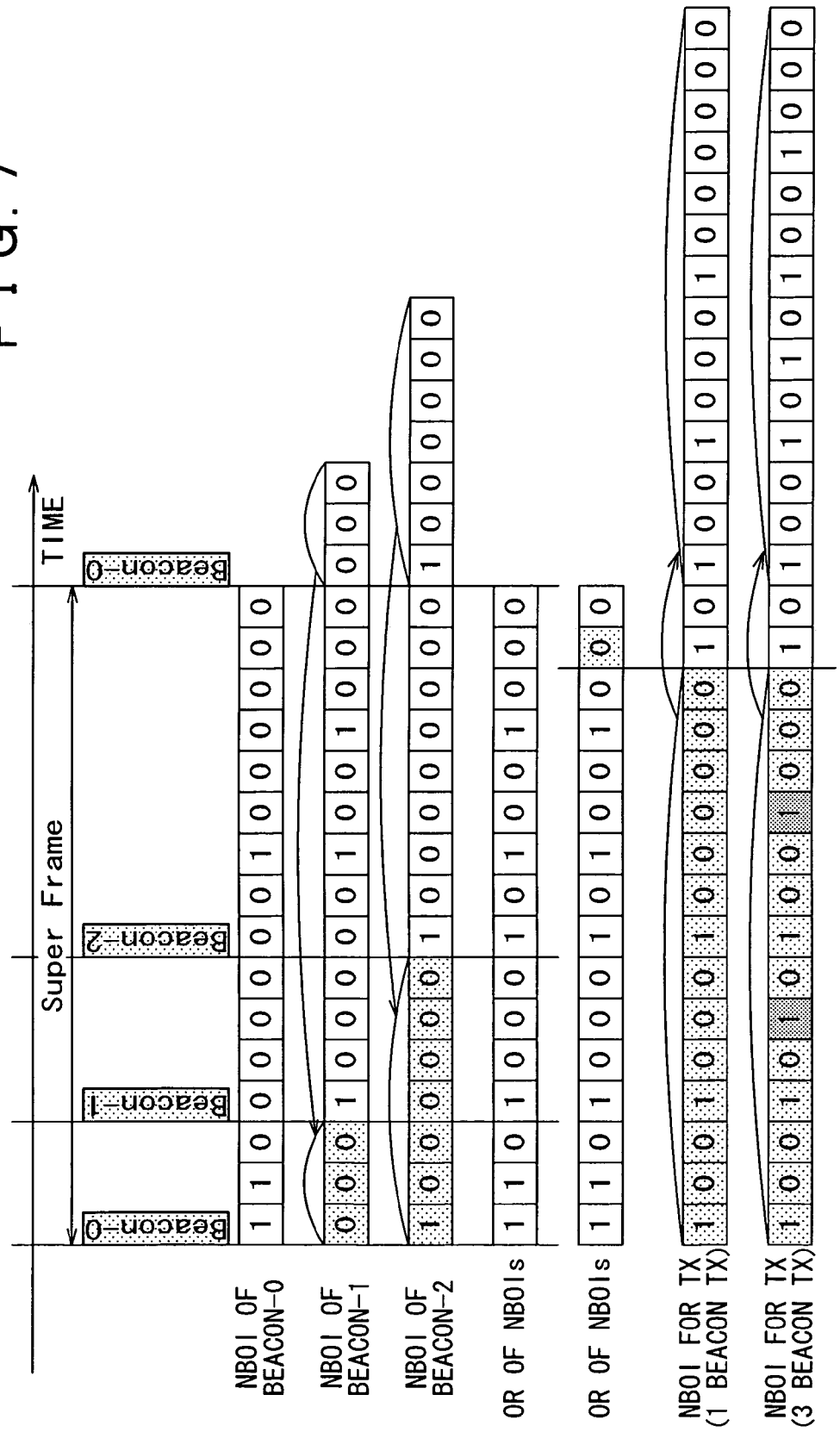
FIG. 7 is a diagram showing a state in which a newly entering communication station sets a TBTT of the own station on the basis of NBOIs of beacons, which obtained from the beacons received from neighboring stations.

FIG. 7 shows a state in which a newly entering communication station sets a TBTT of the own station on the basis of NBOIs of beacons. The NBOIs are obtained from the beacons received from neighboring stations. An NBOI includes 64 bits corresponding to the number of beacons that can be arranged within a super frame. However, description in the following will be made by using an example in which an NBOI includes 16 bits (that is, one super frame includes 16 lots) for simplicity of the drawing.

After turning on power, the communication station first performs scan operation, that is, signal reception continuously for a length of a super frame or more to check for presence of beacons transmitted by neighboring stations. When receiving no beacons from neighboring stations in this process, the communication station sets appropriate timing as a TBTT. When receiving beacons transmitted from neighboring stations, on the other hand, the communication station shifts the NBOI field of each of the beacons received from the neighboring stations according to a time of reception of the beacon, obtains a logical sum (OR) of the NBOIs, and refers to the logical sum (OR) of the NBOIs. Thereby the communication station finally extracts a beacon transmission timing from timings corresponding to unmarked bit positions.

In the example shown in FIG. 7, directing attention to a newly appearing communication station A, a communication environment is assumed in which a communication station 0, a communication station 1, and a communication station 2 are present in the vicinity of the communication station A. Suppose that the communication station A can receive beacons from the three stations 0 to 2 within a super frame by scan operation.

An NBOI field describes times of reception of beacons from neighboring stations in a bit map format in which the times of reception of beacons from the neighboring stations are mapped to bit positions corresponding to relative positions with respect to the regular beacon of the own station (described above). Accordingly, the communication station A shifts the NBOI field of each of the three beacons that can be received from the neighboring stations according to the time of reception of the beacon so as to align corresponding bit positions on a time base, obtains an OR of NBOI bits in each timing, and refers to the OR.

A sequence obtained as a result of integrating and referring to the NBOI fields of the neighboring stations is "1101, 0001, 0100, 1000" indicated by "OR of NBOIs" in FIG. 7, in which sequence 1 denotes a relative position of timing in which a TBTT is already set within a super frame and 0 denotes a relative position of timing in which no TBTT is set. The longest space (zero) run length in this sequence is three, and there are two candidates in the sequence. The communication station A in the example shown in FIG. 7 sets the 15th bit as a TBTT of a regular beacon of the communication station A.

The communication station A sets a time of the 15th bit as the TBTT of the regular beacon of the communication station A (that is, as a start of a super frame of the communication station A), and then starts transmitting the beacon. At this time, an NBOI field transmitted by the communication station A is indicated by "NBOI for TX (1 Beacon TX)" in FIG. 7, which field describes a time of reception of each of the beacons from the communication stations 0 to 2 from which the beacons can be received in a bit map format by marking a bit position corresponding to a relative position with respect to the time of transmission of the regular beacon of the communication station A.

When the communication station A transmits an auxiliary beacon for a purpose of obtaining a preferential transmission right to secure a band, for example, the communication station A thereafter finds the longest space (zero) run length in the sequence indicated by the "OR of NBOIs" in FIG. 7 obtained by integrating the NBOI fields from the neighboring stations, and sets a time of transmission of the auxiliary beacon in a position of the found space. The example shown in FIG. 7 assumes a case of transmitting two auxiliary beacons. Timings of transmission of the auxiliary beacons are set at times of spaces of the 6th bit and the 11th bit in the "OR of NBOIs." In this case, in the NBOI field transmitted by the communication station A, the relative positions of the regular beacon of the communication station A and the beacons received from the neighboring stations as well as positions where the communication station A performs beacon transmission (relative positions with respect to the regular beacon) are marked as indicated by "NBOI for TX (3 Beacon TX)."

When each communication station transmits beacons after setting the beacon transmission timing TBTT of the own station by a process procedure as described above, beacon collision can be avoided under a condition of no variation in ranges in which radio waves arrive with each communication station standing still. Also, auxiliary beacons (or a signal similar to a plurality of beacons) in addition to a regular beacon within a super frame are transmitted according to priority of transmitting data (that is, according to a required band). Thus, it is possible to assign resources preferentially and thereby provide QoS communication. In addition, the number of beacons received from neighboring stations (NBOI field) is refereed. Thus, each communication station can autonomously grasp a degree of saturation of the system. Thus, though the system is a distributed control system, priority traffic can be accommodated while each communication station takes the degree of saturation of the system into consideration. Further, communication stations refer to NBOI fields of received beacons and arrange beacon transmission times so as to prevent coincidence between the beacon transmission times. Therefore, even when a plurality of communication stations accommodate priority traffic, frequent occurrence of collision can be avoided.

C. Access Procedure in Autonomous Distributed Type Network

The wireless communication apparatus 100 operating as a communication station performs communication operation such as transmission control using a transmission channel effectively by transmission (MAC) frames having a loose time division multiple access structure or random access based on CSMA/CA under a communication environment in which a specific control station is not disposed.

Communication stations achieve time synchronization with each other by sending beacons, and perform transmission control using channel resources effectively by transmission (MAC) frames having a loose time division multiple access structure. In this case, each communication station can carry out an access method based on time synchronization, in which a band is reserved or a priority use period is set, for example.

Figure 8:
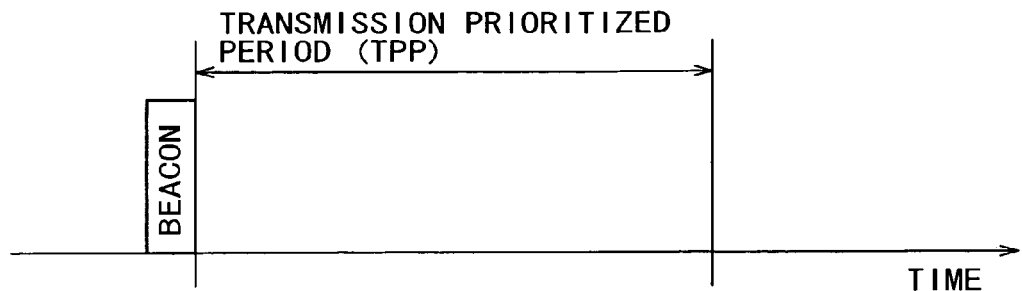
FIG. 8 is a diagram showing a state in which a station that has transmitted a beacon is given a preferential right.

Each communication station in the present embodiment transmits a beacon at regular intervals. For a while after a beacon is transmitted, the station that has transmitted the beacon is given a preferential right to transmission, whereby signal traffic is controlled on an autonomous distributed basis and a communication band (QoS) is secured. FIG. 8 shows a state in which a station that has transmitted a beacon is given the preferential right. In the present specification, this preferential transmission interval is defined as a "Transmission Prioritized Period (TPP)."

Figure 9:
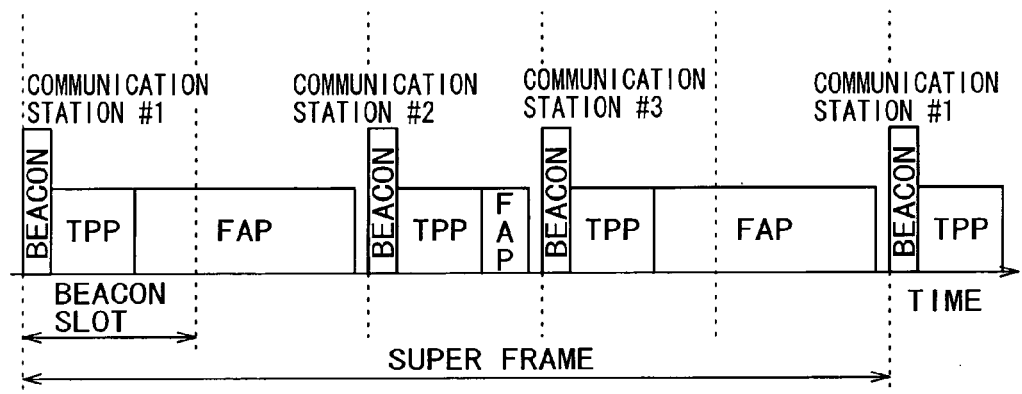
FIG. 9 is a diagram showing an example of configuration of a super frame (T_SF) when a transmission prioritized period TPP is given to beacon sender stations.

FIG. 9 shows an example of configuration of a super frame (T_SF) when a transmission prioritized period TPP is given to beacon sender stations. As shown in FIG. 9, after transmission of a beacon from each communication station, a TPP is assigned to the communication station that has transmitted the beacon. An interval following the TPP is defined as a "fair access period (FAP)," in which all communication stations perform communication by a normal CSMA/CA method. Then, the FAP is ended in timing of transmission of a beacon from a next communication station. Thereafter a TPP of the beacon sender station and a FAP similarly follow.

While each communication station basically transmits one beacon in each super frame, each communication station is allowed to transmit a plurality of beacons or a signal similar to the beacons as required to thereby obtain a TPP each time the communication station transmits a beacon. In other words, a communication station can secure resources for preferential transmission according to the number of beacons transmitted in each super frame. A beacon always transmitted at a start of a super frame by a communication station is referred to as a "regular beacon," and a second beacon and subsequent beacons transmitted in other timing for obtainment of a TPP and other purposes are referred to as "auxiliary beacons."

Figure 10:
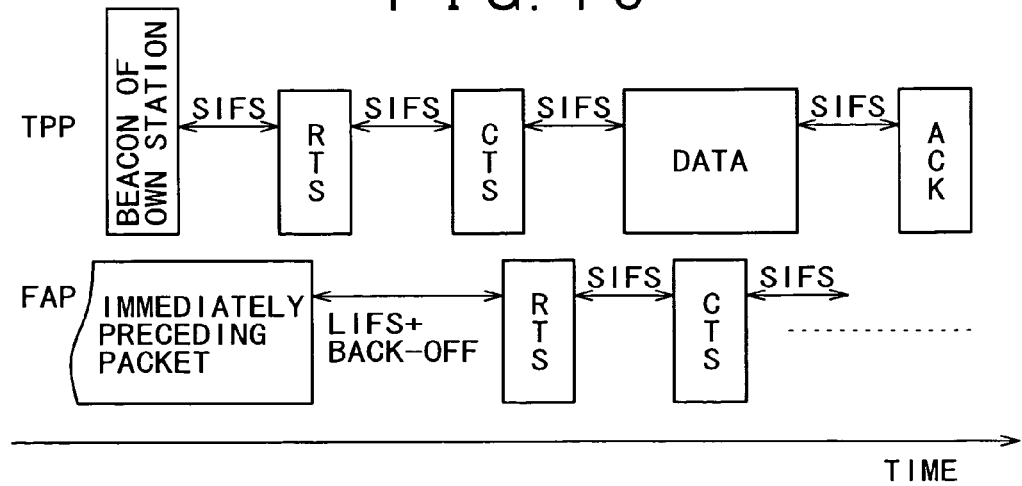
FIG. 10 is a diagram of assistance in explaining operations of a communication station for starting transmission in each of a TPP interval and an FAP interval.

FIG. 10 illustrates operations of a communication station for starting transmission in a TPP interval and a FAP interval.

Within the TPP interval, the communication station can start transmission after a shorter packet interval SIFS after transmitting a beacon of the own station. In the example shown in FIG. 10, the beacon sender station transmits an RTS packet after the SIFS. Thereafter the beacon sender station transmits CTS, data, and ACK packets with the same inter-frame space of SIFS between the packets. The beacon sender station can thereby perform a series of communication procedures without being interrupted by a neighboring station.

On the other hand, in the FAP interval, the beacon sender station starts transmission after standing by for a period of LIFS+random back-off as with other neighboring stations. In other words, a right to transmission is equally given to all the communication stations due to the random back-off. In the example shown in FIG. 10, after a beacon of another station is transmitted, the beacon sender station first monitors a state of a medium for a period of LIFS. When the medium is clear, that is, there is no signal transmitted during this period, the beacon sender station further performs a random back-off. When there is no signal transmitted during this period, the beacon sender station transmits an RTS packet. Incidentally, the beacon sender station transmits a series of packets such as CTS, data, and ACK packets after the RTS signal with the inter-frame space of SIFS between the packets. The beacon sender station can thereby perform a series of communication procedures without being interrupted by a neighboring station.

According to the above-described signal traffic control method, a communication station of high priority can preferentially obtain a right to transmission by setting a shorter inter-frame space.

However, the transmission prioritized period TPP is fixed at a certain period less than the minimum beacon interval. Thereafter a transition is made to a period of a FAP where all the communication stations obtain a communication right under equal conditions with a common IFS and random back-off. Hence, when a request from a higher layer indicates that a communication station requires a communication band exceeding the transmission prioritized period TPP obtained by transmission of one beacon in each super frame, the communication station for example transmits an auxiliary beacon in addition to a regular beacon to thereby obtain another TPP.

Figure 11:
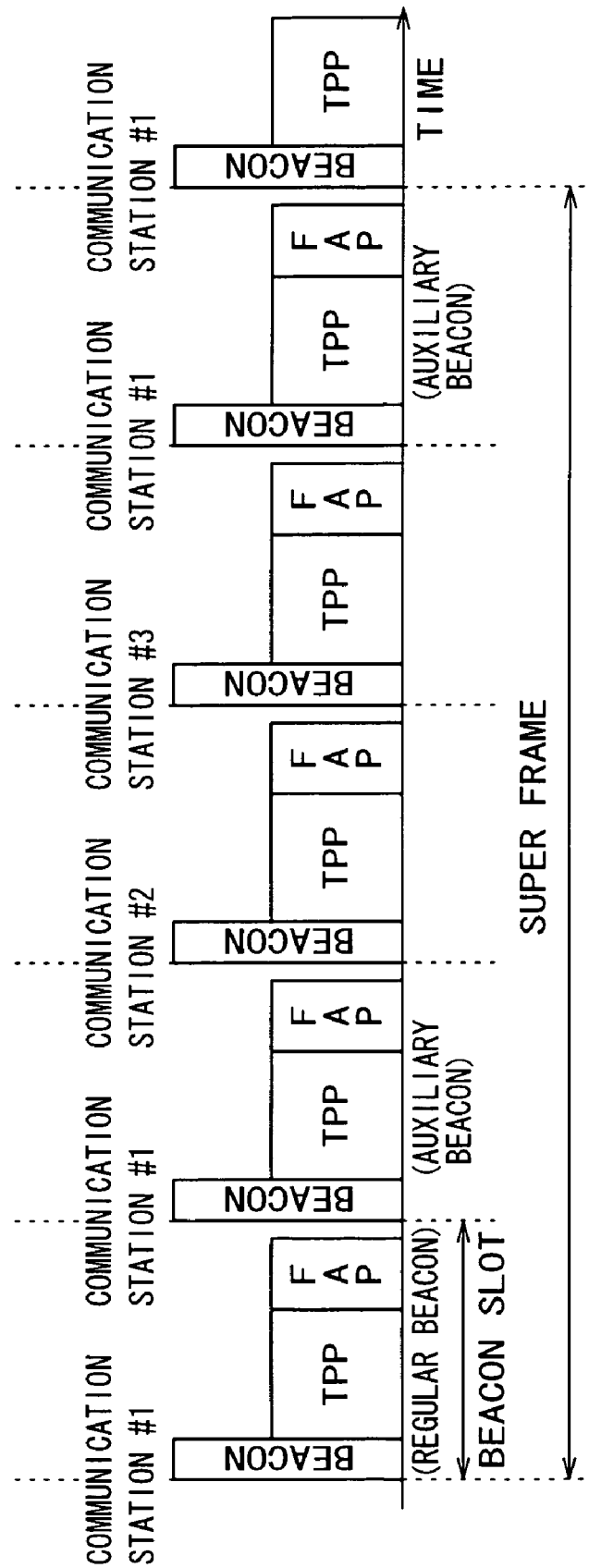
FIG. 11 is a diagram showing a state in which a communication station increases transmission prioritized periods by transmitting a plurality of virtual beacons referred to as auxiliary beacons.

FIG. 11 shows a state in which a communication station increases transmission prioritized periods by transmitting a plurality of virtual beacons referred to as auxiliary beacons. In the example shown in FIG. 11, to secure a communication band requested from a higher layer, a communication station #1 finds open beacon slots within a super frame, and arranges auxiliary beacons of the communication station #1, thereby obtaining a plurality of TPPs within the single super frame. In a system constructing a super frame on an autonomous distributed basis by exchanging NBOI information, open beacon slots can be retrieved with a hidden terminal problem taken into consideration, and therefore a method of obtaining a band using auxiliary beacons is easy.

Figure 12:
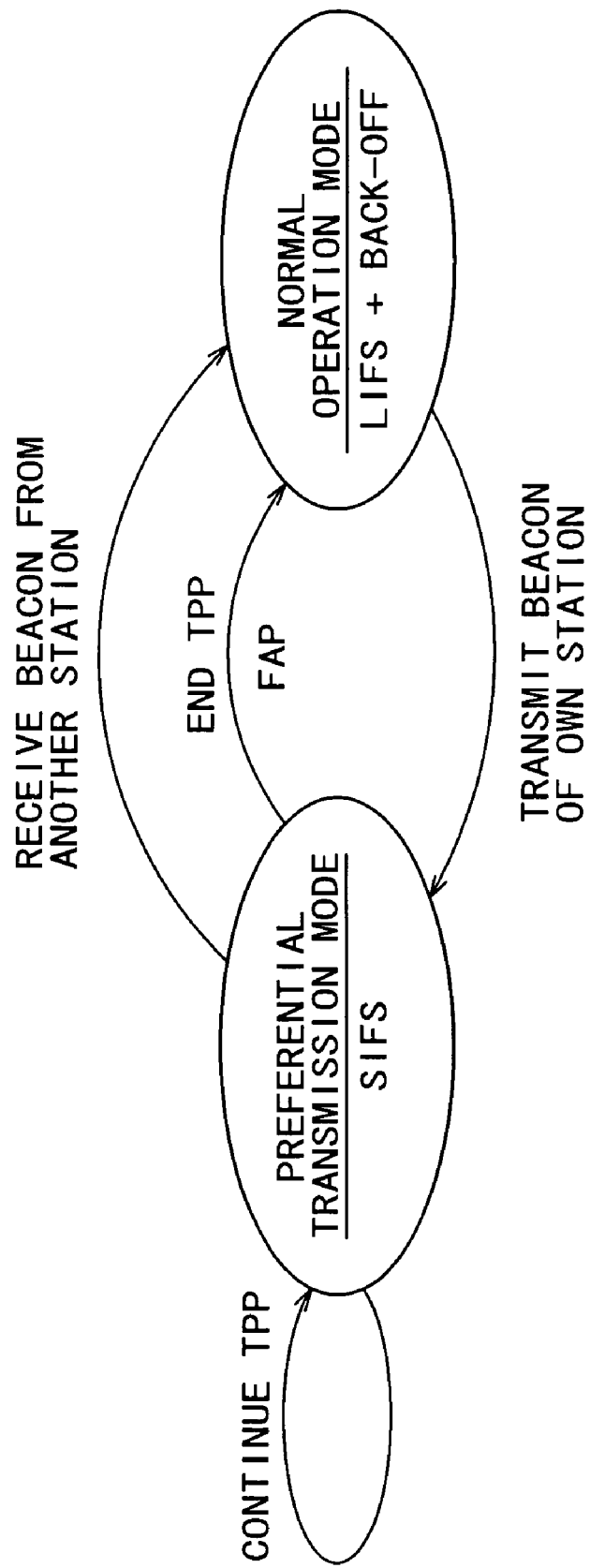
FIG. 12 is a diagram of state transitions of a wireless communication apparatus operating as a communication station.

FIG. 12 is a diagram of state transitions of a wireless communication apparatus operating as a communication station in the present embodiment. In the example shown in FIG. 12, two states are defined: a "preferential transmission mode" corresponding to a TPP period in which the own station has a preferential transmission right and a "normal transmission mode" corresponding to a FAP period in which none of communication stations have a preferential transmission right.

In the normal operation mode, the communication station starts transmission after standing by for a period of LIFS+random back-off.

After beacon transmission timing TBTT of the own station arrives and the communication station transmits a beacon, the communication station makes a transition to the preferential transmission mode to obtain a transmission prioritized period TPP.

In the preferential transmission mode, the communication station performs transmission with an inter-frame space of SIFS, and can thereby obtain a transmission right without being interrupted by neighboring stations.

The communication station continues the preferential transmission mode for the transmission prioritized period TPP having a length corresponding to a band amount requested by a higher layer.

Then, when the TPP is ended and a transition is made to a FAP, or when a beacon of another station is received, the communication station returns from the preferential transmission mode to the normal operation mode.

Figure 13:
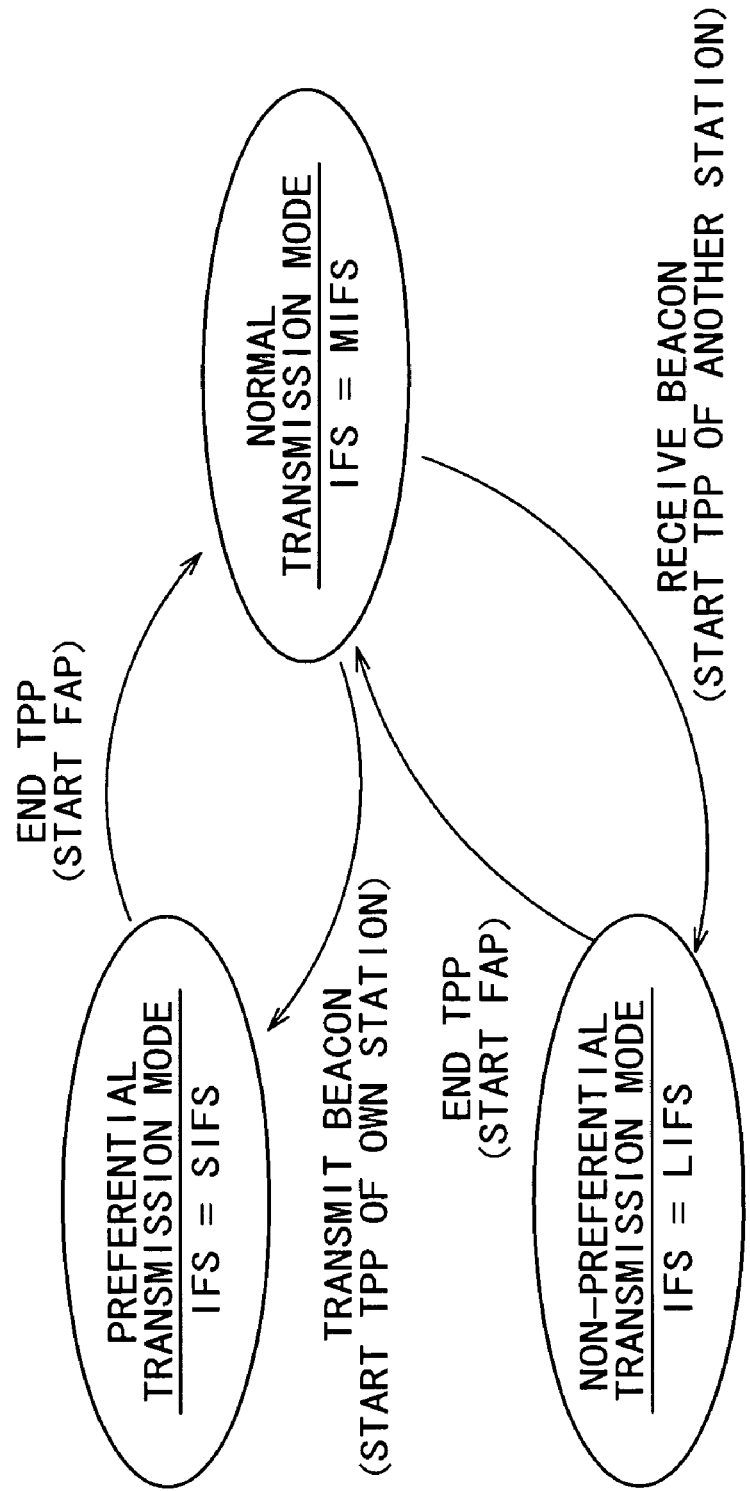
FIG. 13 is a diagram of state transitions of a wireless communication apparatus operating as a communication station.

FIG. 13 is a diagram of another example of state transitions of a wireless communication apparatus operating as a communication station. In the example shown in FIG. 13, a "non-preferential transmission mode" corresponding to a TPP period of another station is defined in addition to the "preferential transmission mode" corresponding to a TPP period in which the own station has a preferential transmission right and the "normal transmission mode" corresponding to a FAP period in which none of communication stations have a preferential transmission right.

In the normal operation mode, the communication station starts transmission after standing by for a period of a normal frame interval MIFS plus random back-off. During the FAP period, all the communication stations within the system perform transmission after a period of MIFS+back-off.

After beacon transmission timing TBTT of the own station arrives and the communication station transmits a beacon, the communication station makes a transition to the preferential transmission mode to obtain a transmission prioritized period TPP.

In the preferential transmission mode, the communication station performs transmission with a standby period of a frame interval SIFS, which is shorter than MIFS, and can thereby obtain a transmission right without being interrupted by neighboring stations. The communication station continues the preferential transmission mode for the transmission prioritized period TPP having a length corresponding to a band amount requested by a higher layer. Then, when the TPP is ended and a transition is made to an FAP, the communication station returns to the normal transmission mode.

When a beacon from the other station is received and the other station enters a transmission prioritized period, the communication station makes a transition to the non-preferential transmission mode. In the non-preferential transmission mode, the communication station starts transmission after standing by for a period of a frame interval LIFS even longer than a frame interval MIFS at the time of the normal transmission mode plus random back-off.

Then, when the TPP of the other station is ended and a transition is made to an FAP, the communication station returns to the normal transmission mode.

D. Achieving Time Synchronization in Autonomous Distributed Type Network

As described above, in an autonomous distributed type wireless communication system having no relation of a control station and controlled stations, each communication station makes presence of the communication station itself known to other communication stations in the neighborhood (that is, within a range where communication is possible) by sending beacon information periodically on a channel, and notifies a network configuration. Since a communication station transmits a beacon at a start of a transmission frame cycle, the transmission frame cycle, that is, a super frame is defined by a beacon interval. Also, each communication station can detect a beacon signal transmitted from neighboring stations by performing scan operation on the channel for a period corresponding to a super frame, and be informed of the network configuration (or enter the network) by decoding information described in the beacon.

Communication stations achieve time synchronization with each other by sending beacons to each other, and perform transmission control using channel resources effectively by transmission (MAC) frames having a loose time division multiple access structure. In this case, each communication station can carry out an access method based on time synchronization, in which a band is reserved or a priority use period is set, for example.

In the autonomous distributed type wireless communication system employing such an access method based on time synchronization, each communication station needs to periodically send beacon information and manage beacon information as described above while maintaining time synchronization with neighboring stations. Also, in the access method based on time synchronization in which each communication station sets a transmission prioritized period TPP within a frame cycle, for example, it is very important for communication stations to maintain time synchronization with each other.

Figure 29:
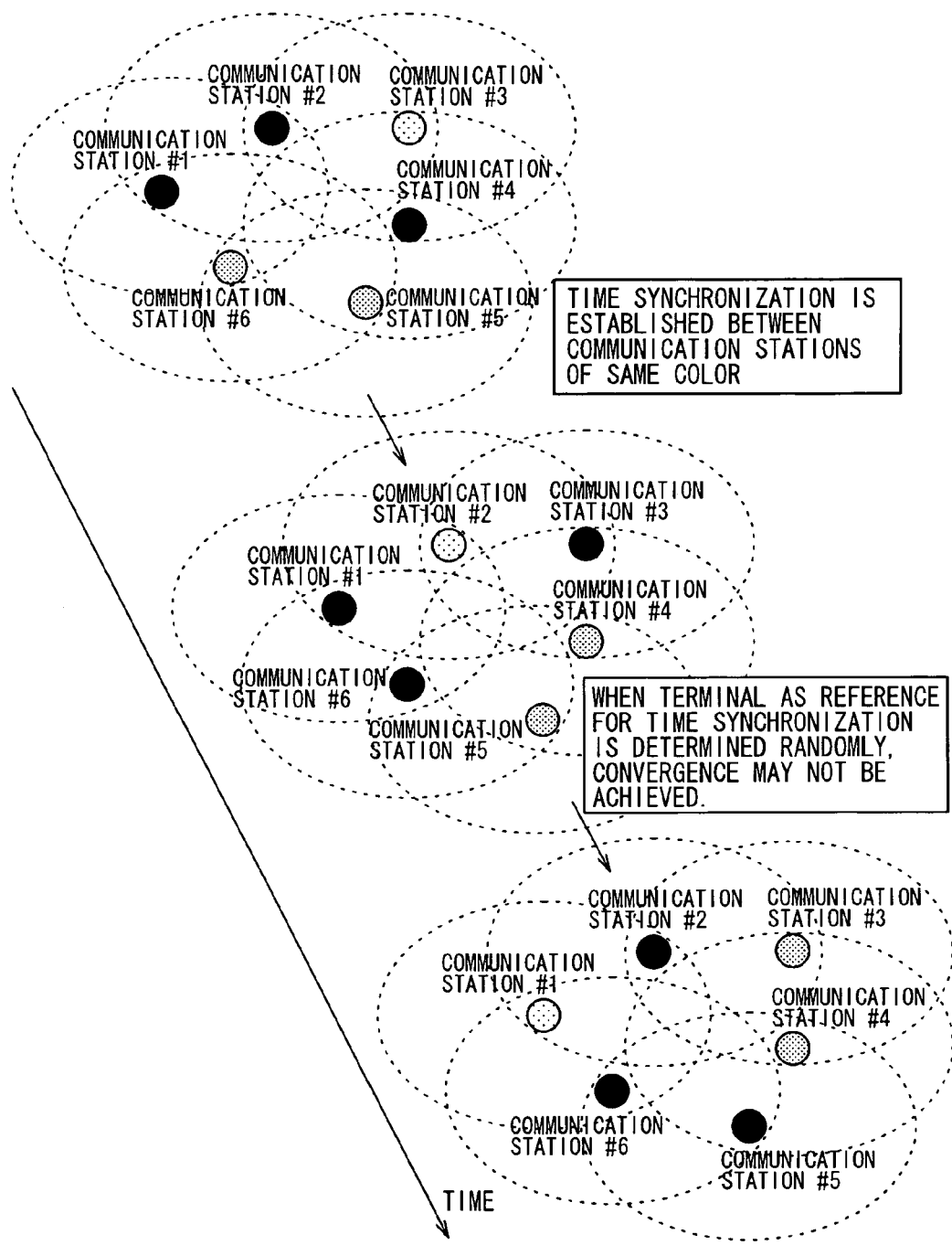
FIG. 29 is a diagram of assistance in explaining one method for achieving time synchronization between communication stations in an autonomous distributed type network.

An easily conceived method for maintaining time synchronization between communication stations in the autonomous distributed type network is for each communication station to randomly select a communication station with which to achieve time synchronization. In an example shown in FIG. 29, a relation of each communication station to a communication station serving as a reference for achieving time synchronization is a communication station #1→a communication station #6 (reference communication station), a communication station #2→the communication station #1, a communication station #3→the communication station #2, a communication station #4→the communication station #3, a communication station #5→the communication station #4, and the communication station #6→the communication station #5. In such a case, depending on timing in which each communication station establishes time synchronization, time synchronization within the same network may not converge, as shown in FIG. 29.

Another conceivable method is for each communication station to uniquely determine a communication station serving as a reference for time synchronization by exchanging information (signaling) with neighboring stations in an ad hoc network and thereafter establish time synchronization with the determined reference communication station on an autonomous distributed basis. As a concrete method, each communication station within the same network temporarily defines a master-slave relation between communication stations by signaling to create a communication station temporarily serving as a control station within the same network, whereby a conventional method is applied to establish time synchronization.

However, when communication is performed between specific communication stations in an autonomous distributed type network environment, there is a problem of a hidden terminal (described above), in that there is a communication station that can be heard by one communication station to which the communication is performed but cannot be heard by another communication station. In such a case, in situations as shown in the following, there are problems of difficulty in determining the master and the slave and complexity of a control process, and there is a fear of increase in overhead attendant on frequently occurring information exchange.

Figure 30:
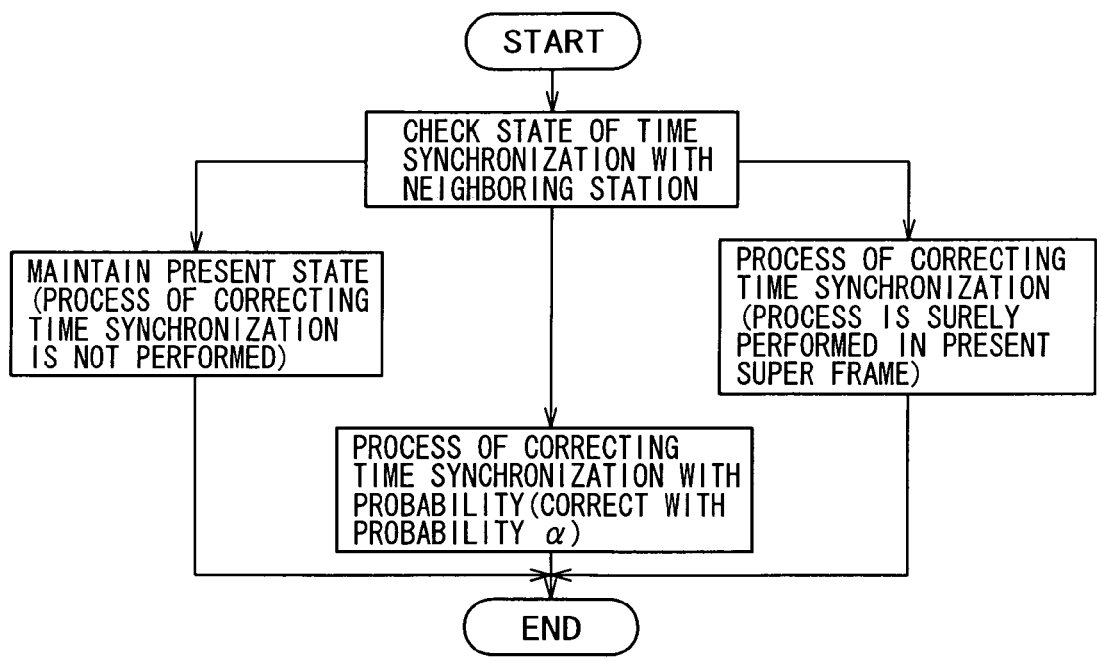
FIG. 30 is a diagram of a basic procedure for a communication station to achieve time synchronization with a neighboring station.

(1) Changing the master and the slave with a change in network topology (2) Resetting the master when the master disappears from the network (3) Control by a plurality of masters in the same network because of limitation of communication ranges Accordingly, the present inventors et al. suggest a method in which each communication station autonomously checks a state of time synchronization with neighboring stations and achieves synchronization according to the state of time synchronization. When a communication station checks a state of time synchronization in each super frame and determines that the time synchronization needs to be corrected, the own station chooses one of methods of not performing a process of correcting the time synchronization (a neighboring station performs the correcting process), surely performing the process of correcting the time synchronization, and performing the correcting process with a predetermined probability (see FIG. 30). By properly using the three methods, it is possible to achieve time synchronization with neighboring stations in various situations assumed in the autonomous distributed type wireless network.

In performing the process of correcting time synchronization, a communication station estimates a parameter indicating a difference in synchronization timing from a neighboring station on an autonomous distributed basis. Then, the communication station determines a communication station as a reference for time synchronization on the basis of the estimated parameter, and achieves time synchronization with the reference communication station, whereby time synchronization between communication stations present within the same network is established. A flow of time synchronization operation to be described below is roughly divided into two procedures as follows.

(1) Estimating a parameter indicating a difference in synchronization timing from a neighboring station (2) Determining a communication station as a reference for time synchronization on the basis of the estimated parameter Each procedure of a method of estimating timing of a start of a super frame of a neighboring station by using a beacon transmitted in a transmission frame cycle and estimating time slot timing of the neighboring station, comparing the estimated time slot timing of the neighboring station with time slot timing of an own station, and correcting time deviation will be described in the following as one embodiment.

D-1. Estimating Parameter Indicating Difference in Synchronization Timing from Neighboring Station FIG. 14 illustrates a beacon transmitting procedure of communication stations. Each communication station slowly performs synchronization while hearing beacons transmitted in the vicinity. When a new communication station appears, the new communication station sets beacon transmission timing of the new communication station itself such that the beacon transmission timing of the new communication station does not coincide with beacon transmission timings (equivalent to super frame start timings) of existing communication stations.

When there is no communication station in the vicinity, a communication station #1 can start transmitting a beacon in appropriate timing. Thereafter the communication station #1 transmits the beacon at intervals of a super frame. A new communication station subsequently entering a range of communication determines beacon transmission timing of the new communication station such that the beacon transmission timing of the new communication station does not coincide with that of existing beacons in beacon arrangement.

However, a minimum beacon interval $B_{min}$ is defined as a minimum time slot unit. In order to prevent a band (super frame) from being filled with too many beacons, timing of transmission of two or more beacons arranged in each slot is prohibited. The number of time slots present within one super frame is a value obtained by dividing a time of one super frame by a time of $B_{min}$. This value represents an upper limit of the number of communication stations that can be present in the same network (described above).

FIG. 15 illustrates a method of estimating timing of a start of a super frame of a neighboring station. FIG. 15 provides a concrete example when a communication station #2 estimates timing of a start of a super frame of the communication station #1.

As a first concrete example, when the beacon of the communication station #1 is transmitted at a start of a super frame, timing of the start of the super frame of the communication station #1, which timing is estimated by the communication station #2, is a time of reception of the beacon. As a second concrete example, when the beacon of the communication station #1 is transmitted at a time shifted by an offset time from a start of a super frame, timing of the start of the super frame of the communication station #1, which timing is estimated by the communication station #2, is a time resulting from subtracting the offset time of the communication station #1 from a time of reception of the beacon.

However, the communication station #2 needs to know in advance the offset time of the communication station #1. Conceivable as an example for implementing this is a method of adding information on an offset time TBTT of an own station as beacon information. In the example shown in FIG. 4, the information on the TBTT offset is described in a TOIS field within a beacon frame (described above). Incidentally, the implementing method is not limited to this as long as neighboring stations can be informed of the offset time TBTT of the own station in advance. For example, the implementation is also possible by using a method of exchanging offset times with each other by signaling.

D-2. Determining Communication Station as Reference for Time Synchronization on Basis of Estimated Parameter A procedure for determining a communication station as a reference for time synchronization and establishing time synchronization will be described with reference to FIG. 16 and FIG. 17.

As described above, a communication station can receive a beacon from a neighboring station and estimate time slot timing of the neighboring station in consideration of $B_{min}$ intervals from estimated timing of a start of a super frame. In the example shown in FIG. 16 and FIG. 17, the communication station #2 can estimate time slot timing of the communication station #1 on the basis of timing of the beacon received by the communication station #2. By comparing a result of the estimation with current time slot timing of the own station, the communication station #2 knows a degree of time synchronization deviation with respect to the communication station #1. Then, each communication station determines a communication station as a reference for time synchronization on the basis of a degree of synchronization deviation on an autonomous distributed basis.

In the example shown in FIG. 16 and FIG. 17, a communication station as a reference for time synchronization is a communication station having time slot timing delayed from the time slot timing of the own station by less than $B_{min}/2$.

In the example shown in FIG. 16, the communication station #1 is a communication station as a reference for time synchronization, and the communication station #2 resets timing of a start of a super frame such that the time slot timing of the communication station #2 coincides with that of the communication station #1.

First, the communication station #2 estimates timing of time slots at $B_{min}$ intervals from a start of a super frame of the communication station #1 (that is, timing of reception of a beacon from the communication station #1). Next, since the time slot timing of the communication station #1 is delayed from the time slot timing of the own station by less than $B_{min}/2$, the time slot timing of the own station is synchronized with that of the communication station #1. Then, using the new time slot timing, the communication station #2 determines beacon transmission timing, that is, a start of a super frame of the own station.

On the other hand, in the example shown in FIG. 17, the communication station #2 does not have a communication station as a reference for time synchronization (that is, the own station is a communication station as a reference for time synchronization for the neighboring station). The communication station #2 therefore does not reset timing of a start of a super frame. Thus, after the communication station #2 transmits a beacon, the communication station #1 detects time synchronization deviation from the communication station #2, and corrects time slot timing.

In this case, the communication station #2 estimates timing of time slots at $B_{min}$ intervals from a start of a super frame of the communication station #1 (that is, timing of reception of a beacon from the communication station #1). In the example shown in FIG. 17, the time slot timing of the communication station #1 is delayed from the time slot timing of the own station by more than $B_{min}/2$. Therefore the time slot timing of the own station is not reset. The communication station #1 thereafter receives a beacon from the communication station #2, and estimates timing of time slots at $B_{min}$ intervals from a start of a super frame of the communication station #2. Then, since the time slot timing of the communication station #2 is delayed from the time slot timing of the own station by less than $B_{min}/2$, the time slot timing of the own station is synchronized with that of the communication station #2. Then, using the new time slot timing, the communication station #1 determines beacon transmission timing, that is, a start of a super frame of the own station.

FIG. 18 illustrates, in a format of a flowchart, a process procedure performed until a communication station determines a communication station as a reference from estimated time slot timing of a neighboring station. This operation is in practice realized in a form of the central control unit 103 within the wireless communication apparatus 100 operating as a communication station executing a predetermined execution procedure instruction program.

The communication station initializes variables used in the process procedure (step S1). The communication station defines a variable BT retaining a communication station as a time slot reference, an array type variable TX[i] retaining a communication station as a beacon sender source using an index i, and a variable dtime retaining an estimated delay time with respect to timing of a start of a time slot of the own station.

Then, the communication station sequentially checks the received beacon from each neighboring station TX[i] (steps S2 and S7).

The communication station first compares estimated time slot timing X with the time slot start timing of the own station to check whether the estimated time slot timing X has a delay of less than $B_{min}/2$ (step S3).

When the delay of the estimated time slot timing X exceeds $B_{min}/2$, the communication station performs no process in this case. On the other hand, when the delay of the estimated time slot timing X is less than $B_{min}/2$, the communication station proceeds to check whether a communication station BT as a time slot reference is determined (step S4).

When the reference communication station BT is not determined yet, the communication station provisionally sets the neighboring station TX[i] as the reference communication station BT as a time slot reference (step S5). When the reference communication station BT is determined, the communication station further compares delays of the reference communication station BT and the neighboring station TX[i] from the time slot start timing of the own station (step S6). When the neighboring station TX[i] has the longer delay from the time slot start timing of the own station, the communication station provisionally sets the neighboring station TX[i] as the reference communication station BT as a time slot reference (step S5).

After performing theses processes for all neighboring stations, the communication station sets the set communication station as the reference communication station BT as a time slot reference (step S8).

When BT is NULL, that is, none of the neighboring stations cannot be set as the reference communication station BT as a time slot reference (step S9), the communication station sets the own station as the reference communication station BT (step S10).

FIG. 19 illustrates a procedure for establishing time synchronization when there are a plurality of communication stations to serve as a reference for time synchronization. In this case, an operation is performed so as to adjust time synchronization to the most delayed communication station. In the example shown in FIG. 19, time synchronization is achieved between the communication station #1 and the communication station #2, and therefore the communication station #1 and the communication station #2 have substantially the same degree of synchronization deviation from a communication station #3. However, on the basis of estimated time synchronization deviations, the communication station #3 synchronizes time slot timing thereof with the communication station having the greater time synchronization deviation. In the example shown in FIG. 19, the communication station #3 corrects time synchronization, whereby time synchronization is established among the communication station #1, the communication station #2, and the communication station #3.

As another method for determining a communication station as a reference for time synchronization, there is a method of entering while synchronous relation in an existing network is maintained only at the time of a new entry. In this case, even when the above-described rule that a communication station delayed from time slot timing of an own station by less than $B_{min}/2$ be a time synchronization reference station is applied, the own station is synchronized with another station only at the time of a new entry even if the own station is a time synchronization reference. The own station thus enters while the synchronous relation in the existing network is maintained.

Specifically, when the scene shown in FIG. 17 is assumed, the communication station #1, the communication station #2, the communication station #3, . . . enter the network in that order. Hence, after the communication station #2 synchronizes time slot timing with that of the communication station #1, the communication station #2 transmits a beacon. Therefore slot timing of the achieved time synchronization differs from the above.

Figure 20:
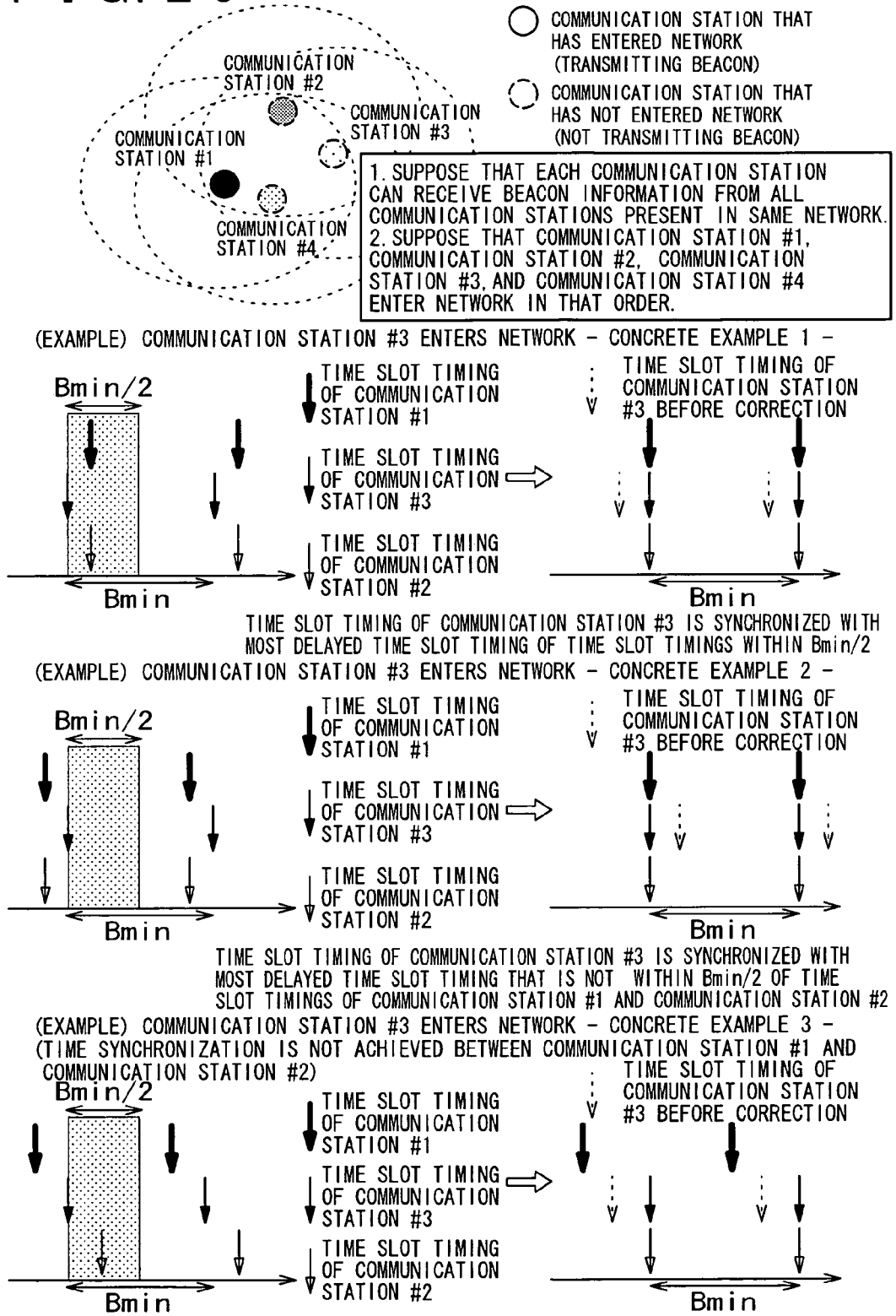
FIG. 20 is a diagram of assistance in explaining a method for achieving time synchronization for entering while synchronous relation in the existing network is maintained only at the time of the new entry.

FIG. 20 illustrates an example of operation for establishing time synchronization at the time of a new entry when the rule that a newly entering station enters while synchronous relation in the existing network is maintained is applied. In FIG. 20, a scene is assumed in which the communication station #3 enters anew while time synchronization is already established between the communication station #1 and the communication station #2.

According to the rule that a communication station delayed from time slot timing of an own station by less than $B_{min}/2$ be a time synchronization reference station, the time slot timing of the communication station #1 and the time slot timing of the communication station #2 are synchronized with each other.

Now suppose that the communication station #3 enters anew. For the communication station #3, there is no communication station delayed by less than $B_{min}/2$ from time slot timing of the own station. Therefore, the own station normally becomes a reference station. Applying the rule that a newly entering station enters while synchronous relation in the existing network is maintained, however, the communication station #3. synchronizes with time slot timing of the most delayed communication station of the communication station

1 and the communication station #2. Since time synchronization is already established between the communication station #1 and the communication station #2 in the example shown in FIG. 20, the communication station #3 synchronizes with the time slot timings of the communication station #1 and the communication station #2, whereby time synchronization within the system is maintained.

FIG. 21 illustrates another example of operation for establishing time synchronization at the time of a new entry when the rule that a newly entering station enters while synchronous relation in the existing network is maintained is applied. In the example shown in FIG. 21, a scene is assumed in which the communication station #3 enters anew while time synchronization is not established yet between the existing communication stations #1 and #2.

First, the newly entering communication station #3 synchronizes with the most delayed time slot timing of the time slot timings of the communication station #1 and the communication station #2. In the example shown in FIG. 21, the communication station #3 synchronizes with the time slot timing of the communication station #2.

Then, according to the rule that a communication station delayed from time slot timing of an own station by less than $B_{min}/2$ be a time synchronization reference station, the communication station #2 synchronizes with the time slot timing of the communication station #1.

Further, according to the normal rule that a communication station delayed from time slot timing of an own station by less than $B_{min}/2$ be a time synchronization reference station, the communication station #3 synchronizes with the time slot timing of the communication station #1 (the communication station #2) this time. As a result, time synchronization is established between all the communication stations within the system.

Thus, when a plurality of communication stations are present in an existing network, a newly entering station determines a communication station as a reference for time synchronization excluding the own station, and can thereafter correct time slot timing by the same method.

FIG. 22 shows states in a process of establishing time synchronization between communication stations when another network is mixed. In FIG. 22, a scene is assumed in which there are two networks, that is, a network #1 including communication stations #1 to #4 and a network #2 including communication stations #5 to #8.

These networks are at first independent of each other. Thereafter the communication station #5 present in the network #2 moves to reach a range where the communication station #5 can communicate with the communication station #3 present in the network #1.

As a result, time synchronization is established between the communication station #3 and the communication station #5. In this case, suppose that the communication station #5 synchronizes time slot timing of the own station with time slot timing of the communication station #3.

Then, the network #2 including the communication stations #5 to #8 performs time synchronization with the communication station #5 as a reference. Eventually time synchronization between the network #1 and the network #2 is established.

Figure 34:
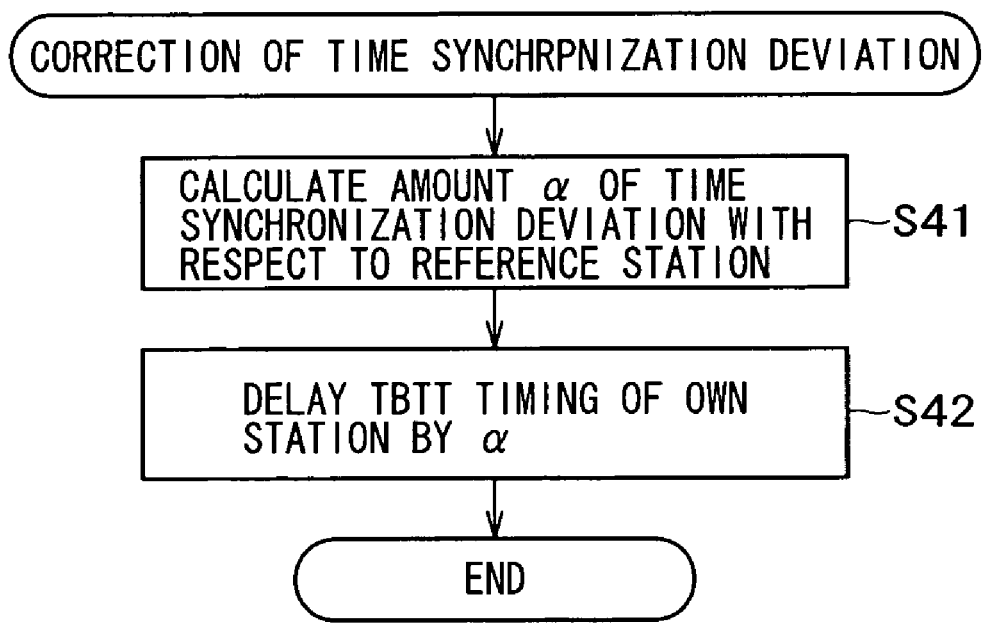
FIG. 34 is a flowchart of a process procedure for a communication station to correct time synchronization deviation with respect to a reference station.

FIG. 34 shows, in a format of a flowchart, a process procedure for a communication station to correct time synchronization deviation with respect to a reference station. A communication station having the most delayed beacon transmission timing is treated as the reference station. The communication station calculates an amount α of time synchronization deviation with respect to the reference station (step S41). The communication station delays TBTT timing of the own station by α(step S42).

D-3. Dealing with Time Synchronization Deviation Due to Estimation Error (1)

It is to be understood from the description so far that time synchronization can be established between communication stations forming a network or between communication stations in mixed networks by applying the rule that a communication station delayed from time slot timing of an own station by less than $B_{min}/2$; be a time synchronization reference station and the rule that a newly entering station enters while synchronous relation in an existing network is maintained.

However, these rules assume that timing of transmission of a packet (a beacon in the present embodiment) used for estimation of time slot timing is known to neighboring stations. A start of a super frame and time slot timing of a neighboring station are estimated, assuming that the beacon is transmitted after the start of the super frame or an offset time TBTT.

In operation of an actual network, however, there is a possibility of the beacon being transmitted in timing other than that intended by a sender source because a channel is used by another communication station, for example. In this case, the above-described method for achieving time synchronization cannot perform time synchronization because an estimation error occurs.

Furthermore, a situation can occur in which because of an error in estimation of time slot timing of a neighboring station, each communication station incorrectly determines that a communication station as a reference for time synchronization is the own station. Consequently, time synchronization with the neighboring station cannot be established indefinitely if estimation errors occur consecutively.

Accordingly, the present inventors et al. suggest a method of avoiding the above-described problem by adding information (defined as INVALID TOIS in this case) indicating whether transmission is performed in intended beacon transmission timing to a beacon.

Figure 23:
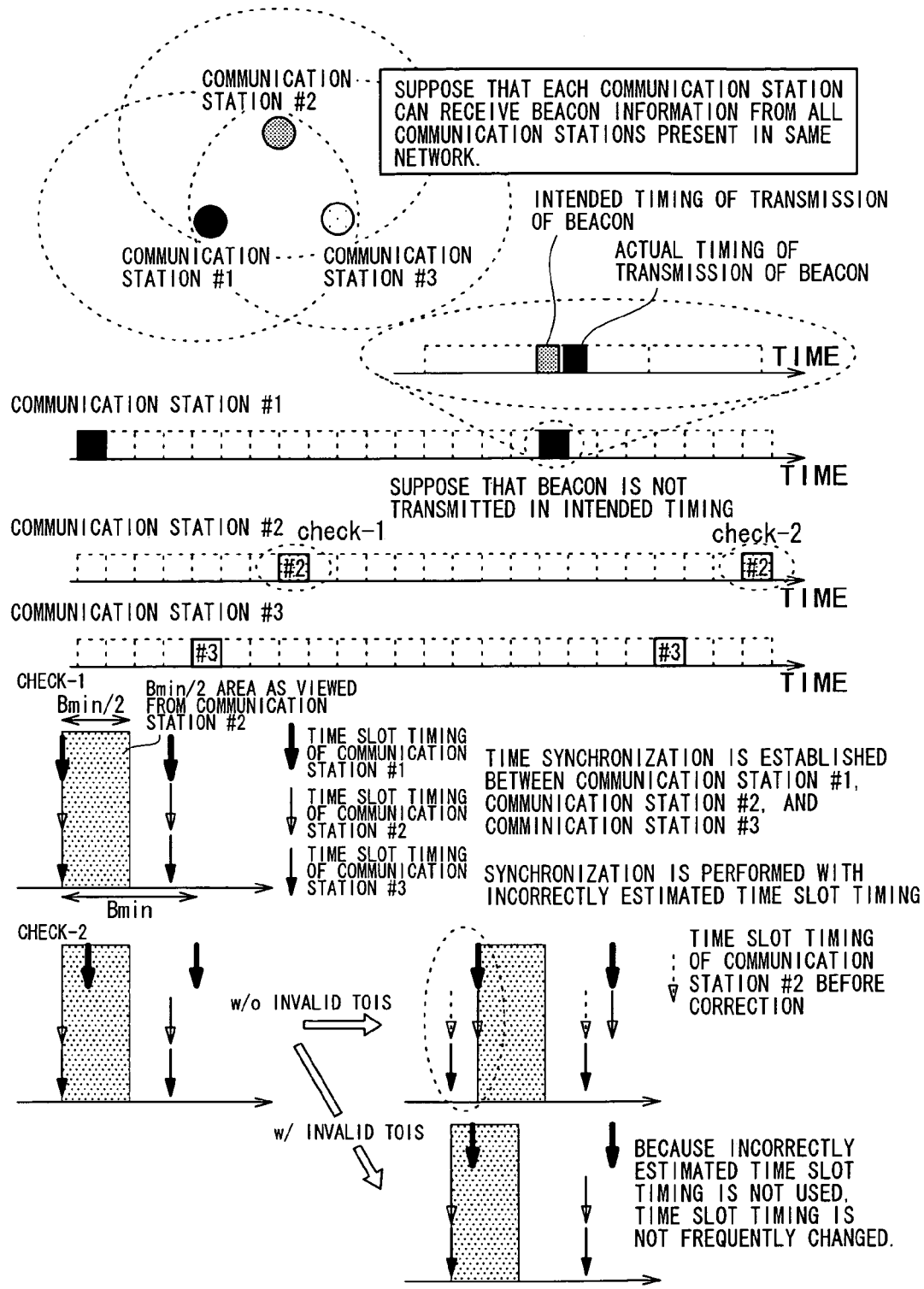
FIG. 23 is a diagram of assistance in explaining a method of maintaining time synchronization using INVALID TOIS.

FIG. 23 illustrates a method of maintaining time synchronization using INVALID TOIS. In the following description, suppose that when INVALID TOIS=0, a received beacon was transmitted in intended transmission timing and that when INVALID TOIS=1, a neighboring station side receiving the beacon determines that the received beacon was not transmitted in the intended transmission timing.

In the example shown in FIG. 23, a scene is assumed in which the communication station #1 transmitted a beacon in timing different from intended transmission timing for some reason.

When INVALID TOIS is not used (W/O INVALID TOIS), an accidental deviation in beacon transmission timing changes time synchronization timing of the network as a whole.

On the other hand, when INVALID TOIS is used (W/INVALID TOIS), a neighboring station side receiving the beacon treats the received beacon as a beacon not transmitted in the intended transmission timing. Consequently, a time slot timing error caused by the accidental deviation in beacon transmission timing is not reflected in time synchronization. Thus, even in a network environment in which deviation in time slot timing frequently occurs, time slot timing does not need to be changed frequently.

Hence, by using INVALID TOIS, it is possible to reduce frequency of synchronizing with incorrectly estimated time slots, and thus construct an ad hoc network with reliability in terms of time synchronization.

D-4. Dealing with Time Synchronization Deviation Due to Estimation Error (2)

There is a possibility that because of an error in estimation of time slot timing of a neighboring station, each communication station incorrectly determines that a communication station as a reference for time synchronization is the own station. Consequently, time synchronization with the neighboring station cannot be established indefinitely if estimation errors occur consecutively.

Accordingly, when a state continues in which a communication station that is consecutively unable to transmit a beacon at an intended time (that is, a communication station consecutively having INVALID TOIS=1) cannot establish time synchronization with a neighboring station, the communication station determines a communication station as a reference for time synchronization excluding the own station, and then corrects time slot timing. It is thereby possible to avoid a situation in which a communication station that is consecutively unable to transmit a beacon at an intended time cannot establish time synchronization indefinitely.

D-5. Addressing Problem of Convergence Not Being Achieved to Correct Time Synchronization As another problem of the above-described method for achieving time synchronization between communication stations, convergence may not be achieved to establish time synchronization within a network depending on timing of convergence for time synchronization.

FIG. 24 shows a state in which convergence is not achieved to correct time synchronization because a steady pattern occurs in timing of correction of time synchronization with neighboring stations. As shown in FIG. 24, in a case where the communication station as a reference for time synchronization is changed in order of the communication station #1→the communication station #2, the communication station #2→the communication station #3, and the communication station #3→the communication station #1 within the system, depending on timing of correction of time synchronization, there is a possibility that only sequential changing of the reference station occurs and that convergence is not achieved to establish time synchronization.

Accordingly, in addition to the above-described method of achieving time synchronization, the present inventors et al. suggest a method of correcting time slot timing of an own station with a probability $\alpha(0<\alpha<1)$ when it is determined that new time synchronization correction is required. Thereby each communication station can be prevented from steadily correcting time slot timing. It is thereby possible to avoid a situation in which convergence is not achieved to establish time synchronization as shown in FIG. 24.

Figure 25:
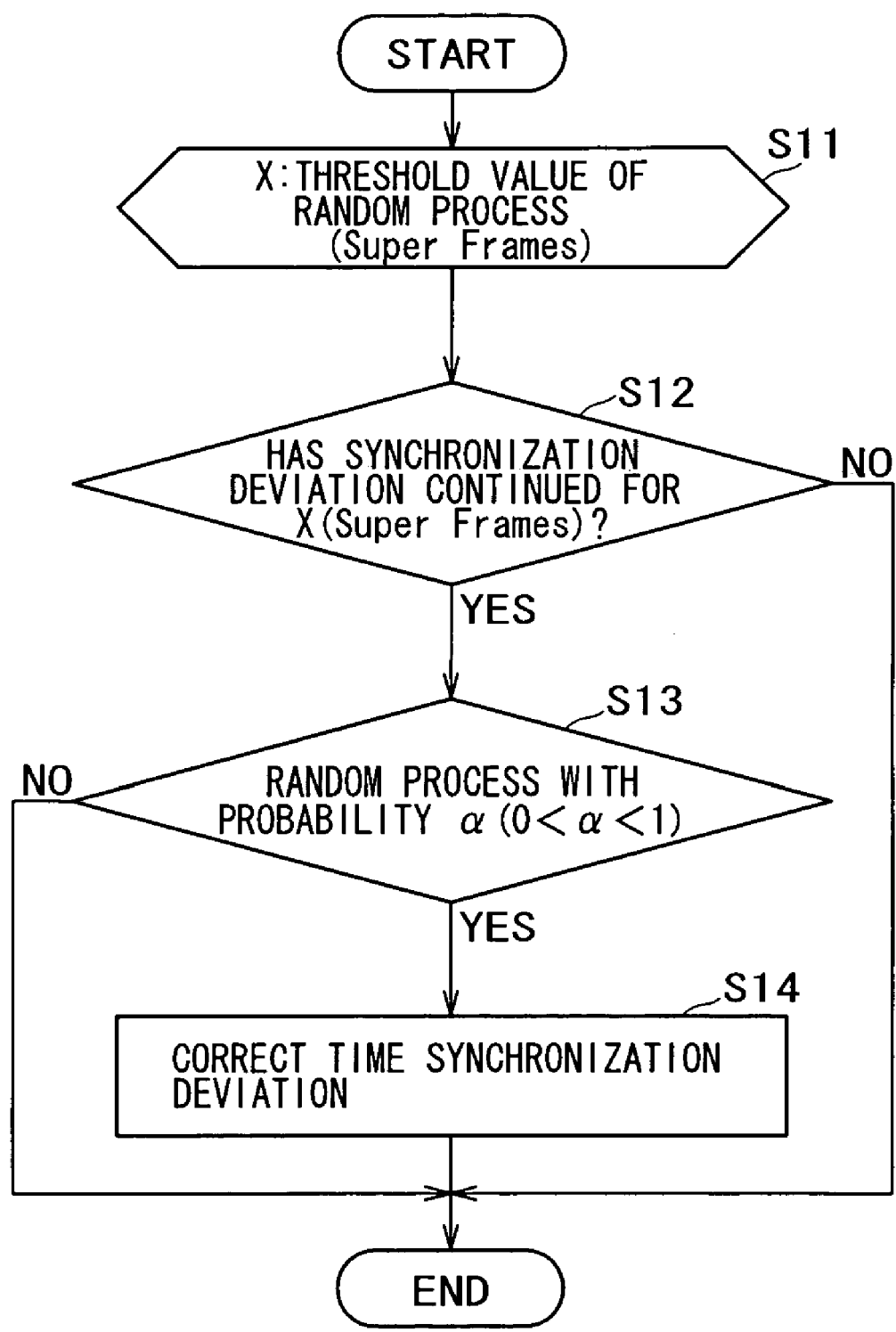
FIG. 25 is a flowchart of a process procedure for achieving synchronization for performing a probabilistic process so as to prevent occurrence of a steady pattern in timing of correction of time synchronization with neighboring stations.
Figure 28:
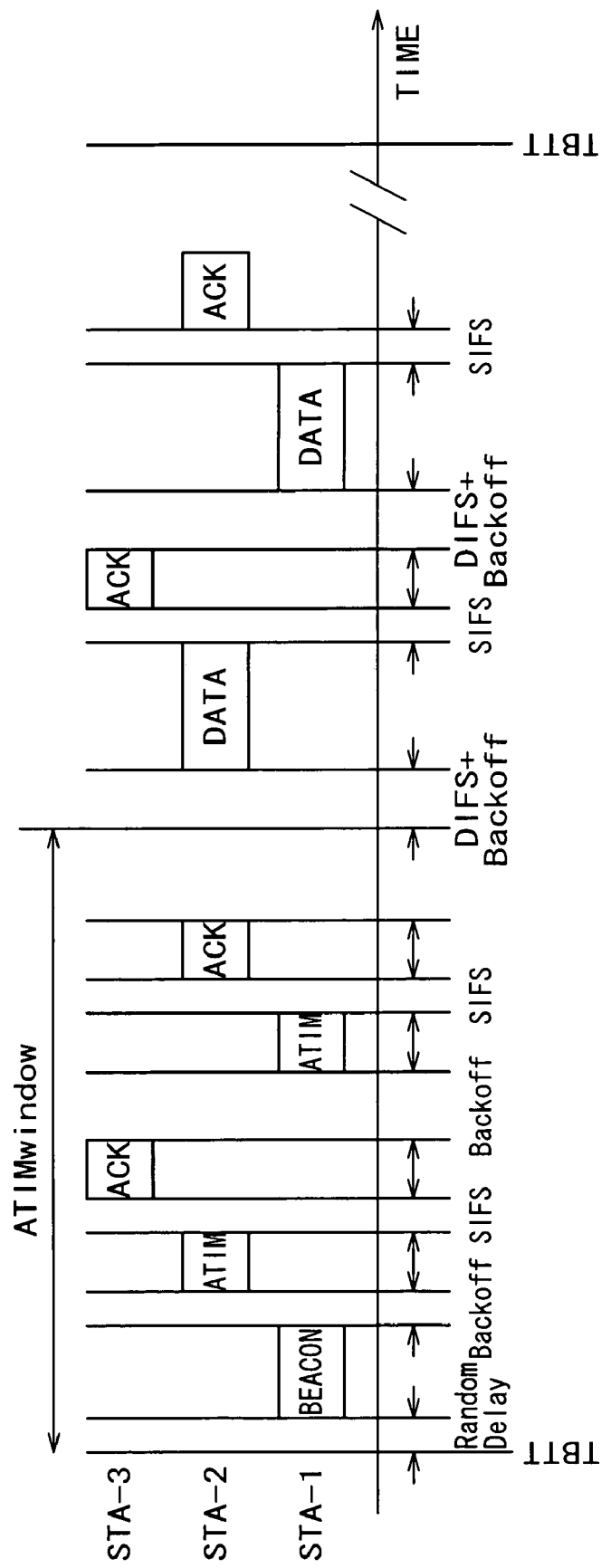
FIG. 28 is a diagram of assistance in explaining operation in a sleep state in an IBSS at the time of an ad hoc mode in IEEE802.11 networking.

FIG. 25 shows, in a format of a flowchart, a process procedure for achieving synchronization. The procedure performs a probabilistic process so as to prevent occurrence of a steady pattern in timing of correction of time synchronization with neighboring stations. This operation is in practice realized in a form of the central control unit 103 within the wireless communication apparatus 100 operating as a communication station executing a predetermined execution procedure instruction program.

A threshold value X of performing a random process, that is, the number of consecutive super frames for which time synchronization deviation is detected as a threshold at which to start the following process is determined (step S11).

When time synchronization deviation is detected for X super frames, the random process with a probability $\alpha$ $(0<\alpha<1)$ is applied (step S13).

In this case, when the communication station detects the time synchronization deviation, the communication station starts the process of correcting the time synchronization deviation with only the rate of $\alpha$(step S14), instead of correcting the time synchronization deviation without fail.

For example, it is determined that time synchronization needs to be corrected when time synchronization deviation is detected for several consecutive super frames (X super frames in FIG. 25). At this time, instead of immediately correcting time synchronization, whether to perform the time synchronization process by the random process with the probability $\alpha$ is determined.

D-6. Synchronization Process with Intermittently Receiving Communication Station Taken into Consideration An intermittent reception mode in which a communication station that is not transmitting or receiving data to or from neighboring stations performs data reception for only a certain interval and performs only beacon transmission during other times has been introduced in many wireless network systems for a purpose of reducing power consumption.

However, when the time slot timing of the own station is corrected with a probability as described above, since an intermittently receiving communication station in particular has a long period of time before a next time synchronization process because of the intermittent reception, it may take a long time before time synchronization is corrected.

Accordingly, in a method of a time synchronization process with an intermittently receiving communication station taken into consideration, consideration is given so that the intermittently receiving communication station performs the time synchronization process earlier than a normal communication station in correction of time slot timing of the own station. The correction is performed with a probability $\alpha(0<\alpha<1)$. Further, a threshold value for a time from detection of a time synchronization deviation to correction of time synchronization is provided. Thus, it is possible to prevent lengthening of the time from detection of a time synchronization deviation to correction of the time synchronization deviation. Otherwise, it will be a problem in an intermittently receiving communication station in particular.

FIG. 26 shows a synchronization process procedure with an intermittently receiving communication station taken into consideration in a format of a flowchart. This operation is in practice realized in a form of the central control unit 103 within the wireless communication apparatus 100 operating as a communication station executing a predetermined execution procedure instruction program.

A first threshold value X of performing a random process and a second threshold value Y of performing the random process are set (step S21). Incidentally, the parameters X and Y ($0<X<Y$, and X and Y are an integer) in FIG. 26 represent time from detection of synchronization time deviation in super frame units. However, the values may be represented by a time such as seconds, milliseconds, or the like.

First, whether the own station is performing intermittent reception is determined (step S22).

In a case where the own station is not performing intermittent reception, when a time synchronization deviation is detected consecutively for a super frame time (X super frames in FIG. 26) (step S23), it is determined that time synchronization needs to be corrected, and the random process is performed.

Even in the case where the own station is not performing intermittent reception, in order to prevent lengthening of a time from detection of a synchronization deviation to correction of the synchronization deviation by the random process, whether a time synchronization deviation is detected consecutively for a super frame time (Y super frames in FIG. 26) is further determined (step S24).

When a time synchronization deviation is detected consecutively for Y super frames, step S25 is skipped to immediately correct time synchronization without performing the random process (step S26).

When a time synchronization deviation is not yet detected consecutively for Y super frames, the random process with a probability $\alpha(0<\alpha<1)$ is applied (step S25), and the time synchronization deviation is corrected (step S26).

On the other hand, when the own station is performing intermittent reception, the process directly proceeds to the random process unlike the above-described case of normal operation. Specifically, whether a time synchronization deviation is detected consecutively for a super frame time (X super frames in FIG. 26) is checked (step S27).

When a time synchronization deviation is not yet detected consecutively for X super frames, the random process with a probability $\alpha(0<\alpha<1)$ is applied (step S28), and the time synchronization deviation is corrected (step S29).

When a time synchronization deviation is detected consecutively for X super frames (step S27), time synchronization is immediately corrected (step S29). Thus, an intermittently receiving communication station can correct time synchronization earlier than a normal communication station. It is therefore possible to prevent lengthening of a time from detection of a time synchronization deviation to correction of the time synchronization deviation, which can be a problem in an intermittently receiving communication station in particular.

D-7. Shortening Time Synchronization Correction Process

In this section, description will be made of a method of achieving synchronization with emphasis placed on shortening of a time required to correct time synchronization.

In the foregoing embodiment, a communication station checks a state of time synchronization with a neighboring station. In a case where a time synchronization deviation is detected, the communication station immediately corrects the time synchronization with a probability when the time synchronization of the own station needs to be corrected.

However, when only a beacon not transmitted in intended beacon transmission timing (INVALID TOIS=1) continues to be received, when there are errors in estimation of time slot timing, and when neighboring stations continue to mutually perform correction, for example, a time synchronization deviation may be detected for an indefinite time.

In addition, as shown in FIG. 31, when super frame start timing of each of communication stations that are out of synchronization is situated precisely in the middle of a time synchronization slot, there is a possibility that neither of the communication stations performs a time synchronization correction process as a result of determination in step S3 in FIG. 18 (described above).

Accordingly, assuming such cases, when a time synchronization deviation is detected for several super frames consecutively, or when only a beacon not transmitted in intended beacon transmission timing (INVALID TOIS=1) continues to be received, the probabilistic time synchronization correction process is applied regardless of whether an own station needs to correct time synchronization. FIG. 32 shows a process procedure in this case in a format of a flowchart.

First, a first threshold value (super frames) of performing a random process is assigned to a variable X, and the number of consecutive SF times that synchronization deviation is detected or a beacon with INVALID TOIS=1 is received is assigned to a variable count_cont_detection (step S31).

When a synchronization deviation from a neighboring station is detected, or when a beacon with INVALID TOIS=1 is received (step S32), the variable count_cont_detection is incremented by one (step S33).

Then, when a value of the variable count_cont_detection exceeds the first threshold value X (step S34), or when the own station needs to perform time synchronization (step S35) even if the value of the variable count_cont_detection does not exceed the first threshold value X, the communication station determines whether to actually perform the time synchronization correction process with a predetermined probability $\alpha(0<\alpha<1)$ (step S36).

When it is determined that the process of correcting time synchronization deviation is to be performed, the process is performed (step S37). The correction process has already been described, and thus description thereof will be omitted.

In order to perform the process of correcting time synchronization between communication stations, a communication station as a reference for time synchronization needs to be determined. However, as shown in FIG. 31, in the time synchronization process when correction of time synchronization by the own station is not required, there is no communication station satisfying "0< time slot start timing<TBTT/2," and therefore a communication station as a reference for time synchronization cannot be determined by the above-described method.

Accordingly, as an example of a method for determining the reference station, a method of setting the most delayed communication station as a reference station is applied. Thereby, when the communication station #1 performs the time synchronization correction process in a communication state shown in FIG. 31, it is possible to set the communication station #2 as a new reference station.

Also, when there are a plurality of communication stations in the vicinity, a communication station delayed most with respect to the communication station performing the time synchronization correction process is set as a reference station. For example, as shown in FIG. 33, in a case where there are a plurality of communication stations in the vicinity, when the communication station #1 performs the time synchronization correction process, a new reference station is the communication station #3 (the most delayed communication station).

In the example shown in FIG. 23, for a purpose of reducing an estimation error as much as possible, a beacon transmitted in intended beacon transmission timing (INVALID TOIS=0) is used to estimate time synchronization timing. In this case, when a time synchronization deviation is detected in an environment where only a beacon not transmitted in intended beacon transmission timing (INVALID TOIS=1) is received, an own station determines that the own station does not need to perform correction and there is a possibility that time synchronization with a neighboring station is not achieved indefinitely. On the other hand, according to the process procedure shown in FIG. 32, it is to be expected that when a beacon with INVALID TOIS=0 has been transmitted from an own station, a neighboring station will perform the time synchronization correction process to thereby achieve synchronization even in such a condition.

The present invention has been explained above in detail with reference to specific embodiments. However, it is obvious that those skilled in the art can make modifications of the embodiments and substitutions without departing from the spirit of the present invention.

In the present specification, a case in which the present invention is applied in a communication environment where communication stations in a wireless network of an autonomous distributed type send a beacon to each other in each predetermined frame cycle has been described as a main embodiment. However, the present invention is not limited to this. For example, the present invention is similarly applicable to a communication system in a different form in which a beacon is transmitted from a plurality of communication stations within a range of communication.

Further, even in other than a communication environment in which communication stations send a beacon to each other, the present invention is similarly applicable to a communication system performing transmission control using channel resources effectively by transmission (MAC) frames having a loose time division multiple access structure, and to a communication system of an autonomous distributed type in which access control is performed on the basis of time synchronization.

In short, the present invention has been disclosed in a form that is illustrative, and contents described in the present specification are not to be construed as restrictive. In order to determine the spirit of the present invention, claims are to be considered.

What is claimed is:

1. A wireless communication system, comprising:
a plurality of communication stations configured to operate independently of a control station, each of said plurality of communication stations is configured to compare an internal time synchronization with a time synchronization of a different one of the plurality of communication stations, to determine whether the internal time synchronization needs correction due to a number of consecutive frames for which a time synchronization deviation is detected, and when the internal time synchronization needs correction, to determine whether or not to perform an internal time synchronization correcting process with a predetermined probability $\alpha(0<\alpha<1)$.

2. A wireless communication system, comprising:
a plurality of communication stations configured to operate independently of a control station, wherein each of the communication stations is configured to:
estimate a plurality of parameters, each parameter associated with a different one of the plurality of communication stations and indicating a time synchronization deviation based on comparing an internal time synchronization with a respective time synchronization of the different one of the plurality of communication stations,
determine one of the different communication stations to be a reference communication station based on the time synchronization deviations indicated by the plurality of estimated parameters, the reference communication station being used as a reference for updating the internal time synchronization respective to the plurality of communication stations, and
update the internal time synchronization respective to the plurality of communication stations based on the reference communication station.

3. A wireless communication system, comprising:
a plurality of communication stations configured to operate independently of a control station, wherein each of the plurality of communication stations is configured to:
estimate a plurality of parameters, each parameter indicating a time synchronization deviation based on comparing an internal time synchronization with a time synchronization of a different one of the plurality of communication stations,
determine a provisional reference communication station to be a reference for updating the internal time synchronization, the determining the provisional reference communication station being based on the time synchronization deviations indicated by the plurality of parameters, and update the internal time synchronization, based on the provisional reference communication station,
exchange predetermined packets with different ones of the plurality of communication stations in a predetermined time period, to estimate a slot start timing of the different communication stations based on a time of reception of the predetermined packets from the different communication stations, in order to identify the communication station having the most delayed slot start timing as a first reference communication station and the communication station having the most advanced slot start timing as a second reference communication station, and
synchronize its own predetermined time period using the first reference communication station or the second reference communication station as references.

4. The wireless communication system as claimed in claim 3,
wherein each of the plurality of communication stations is configured to send a beacon including a flag, said flag indicating whether the beacon is transmitted at an intended time, and
each of the plurality of communication stations is configured to receive the beacon including the flag, and to refer to the flag to determine whether to reduce frequency of synchronizing with incorrectly estimated time slots.

5. A wireless communication system, comprising:
a plurality of communication stations configured to operate independently of a control station,
wherein each of the plurality of communication stations is configured to estimate a plurality of parameters, each parameter indicating a time synchronization deviation based on comparing an internal time synchronization with a time synchronization of a different one of the plurality of communication stations, to determine a reference communication station to be a reference for updating the internal time synchronization, the determining the reference communication station being based on the time synchronization deviations indicated by the plurality of parameters, and to update the internal time synchronization based on the reference communication station, and
when a state continues in which a first communication station cannot transmit a beacon at an intended time, and when a time synchronization deviation from a second communication station is detected, even if slot start timing of the first communication station is most delayed as compared with the second communication station, the first communication station is configured to synchronize with slot start timing of the second communication station.

6. The wireless communication system as claimed in claim 5,
wherein each of the plurality of communication stations is configured to perform a probabilistic process to prevent a steady pattern from occurring in timing of correction of the internal time synchronization when a time synchronization deviation is detected.

7. The wireless communication system as claimed in claim 6,
wherein each of said plurality of communication stations is configured to operate in an intermittent reception mode consisting of performing data reception during a first time interval and performing beacon transmission during a second time interval different than the first time interval; and an intermittently receiving communication station is configured to perform a time synchronization process earlier than a communication station which is not operating in the intermittent reception mode, the time synchronization process consisting of a correction of the slot start timing of the intermittently receiving communication station; and said correction is performed with a probability $\alpha(0<\alpha<1)$, and a threshold value which is provided based on a difference in time from detection of the time synchronization deviation to the correction of the time synchronization.

8. A wireless communication system, comprising:

a plurality of communication stations configured to operate independently of a control station, wherein each of the plurality of communication stations is configured to estimate a plurality of parameters, each parameter indicating a time synchronization deviation based on comparing an internal time synchronization with a time synchronization of a different one of the plurality of communication stations, to determine a reference communication station to be a reference for updating the internal time synchronization, the determining the reference communication station being based on the time synchronization deviations indicated by the plurality of parameters, and to update the internal time synchronization based on the reference communication station, and when the time synchronization deviation continues, or when beacon transmission and reception continues at other than intended times, each of the plurality of communication stations performs a time synchronization correction process with a predetermined probability.

9. A wireless communication apparatus configured to operate independently of a control station, said wireless communication apparatus comprising:

communication means for transmitting and receiving radio data;

communication control means for controlling operation of transmitting and receiving the radio data by said communication means;

time synchronization comparing means for comparing an internal time synchronization with a time synchronization of a different wireless communication apparatus; and synchronization achieving means for determining whether the internal time synchronization needs correction due to a number of consecutive frames for which a time synchronization deviation is detected based on a result of the comparing by said time synchronization comparing means, and carrying out one of a plurality of methods of performing an internal time synchronization correcting process and determining whether or not to perform the internal time synchronization correcting process with a predetermined probability $\alpha(0<\alpha<1)$ when the internal time synchronization needs the correction.

10. A wireless communication apparatus operating in a wireless communication environment configured to operate independently of a control station, said wireless communication apparatus comprising:

communication means for transmitting and receiving radio data;

communication control means for controlling operation of transmitting and receiving the radio data by said communication means;

estimating means for estimating a plurality of parameters, each parameter associated with a different one of a plurality of wireless communication apparatuses and indicating a difference in synchronization timing based on comparing an internal clock time with a clock time of the different wireless communication apparatus; and synchronization achieving means for determining one of the different wireless communication apparatuses to be a reference communication apparatus, for time synchronization respective to the plurality of wireless communication apparatuses, said determining being based on the differences in synchronization timing indicated by the plurality of estimated parameters, and achieving the time synchronization respective to the plurality of wireless communication apparatuses with the reference communication apparatus as the reference.

11. A wireless communication apparatus operating in a wireless communication environment configured to operate independently of a control station, said wireless communication apparatus comprising:

communication means for transmitting and receiving radio data;

communication control means for controlling operation of transmitting and receiving the radio data by said communication means;

estimating means for estimating a plurality of parameters, each parameter indicating a difference in synchronization timing based on comparing an internal clock time with a clock time of a different wireless communication apparatus;

synchronization achieving means for determining one of the different wireless communication apparatuses as a reference communication apparatus to be a reference for time synchronization, based on the differences in synchronization timing indicated by the estimated plurality of parameters, and achieving the time synchronization with the reference communication apparatus as the reference;

beacon information generating means for generating predetermined beacon information; and beacon information analyzing means for analyzing received beacon information received from the different wireless communication apparatuses, wherein said communication control means operates based on time slots and exchanges beacon information with the different wireless communication apparatuses in a predetermined cycle, said estimating means estimates slot start timing of the different wireless communication apparatuses with respect to the internal clock time, based on a time of reception of the received beacon information from the different wireless communication apparatuses, and said synchronization achieving means synchronizes the internal clock time based on one of the different wireless communication apparatuses having most delayed slot start time or one of the different wireless communication apparatuses having most advanced slot start time within a certain time interval.

12. The wireless communication apparatus as claimed in claim 11, wherein the beacon information includes a flag indicating whether a beacon carrying the predetermined beacon information is transmitted at an intended time; and one of said estimating means and said synchronization achieving means refers to flags in the received beacon information and reduces frequency of synchronizing with incorrectly estimated time slots.

13. A wireless communication apparatus operating in a wireless communication environment configured to operate independently of a control station, said wireless communication apparatus comprising:

communication means for transmitting and receiving radio data;

communication control means for controlling operation of transmitting and receiving the radio data by said communication means;

estimating means for estimating a plurality of parameters, each parameter indicating a difference in synchronization timing based on comparing an internal clock time with a clock time of a different wireless communication apparatus; and synchronization achieving means for determining a reference communication apparatus, to be a reference for time synchronization, the determining the reference communication apparatus being based on the differences in synchronization timing indicated by the plurality of estimated parameters, and achieving the time synchronization with the reference communication apparatus as the reference, wherein when a state continues in which the wireless communication apparatus cannot transmit a beacon at an intended time, and when a time synchronization deviation from a second wireless communication apparatus is detected, even if slot start timing of the wireless communication apparatus is most delayed as compared with the second wireless communication apparatus within a certain time interval, said synchronization achieving means synchronizes the wireless communication apparatus with slot start timing of the second wireless communication apparatus.

14. The wireless communication apparatus as claimed in claim 13, wherein when the time synchronization deviation is detected, said synchronization achieving means performs a probabilistic process to prevent a steady pattern from occurring during the time synchronization.

15. The wireless communication apparatus as claimed in claim 14, wherein said communication control means can control operation to operate in an intermittent reception mode, the intermittent reception mode consisting of performing data reception during a first time interval and performing beacon transmission during a second time interval different than the first time interval, said synchronization achieving means operates such that an intermittently receiving wireless communication apparatus performs a time synchronization process earlier than a normal communication station, which is a wireless communication apparatus not operating in intermittent reception mode, the time synchronization process consisting of a correction of the slot timing of the intermittently receiving wireless communication apparatus, said correction is performed with a probability $\alpha(0<\alpha<1)$, and said synchronization achieving means provides a threshold value for a time from detection of the time synchronization deviation to the correction of the time synchronization.

16. A wireless communication apparatus operating in a wireless communication environment configured to operate independently of a control station, said wireless communication apparatus comprising:

communication means for transmitting and receiving radio data;

communication control means for controlling operation of transmitting and receiving the radio data by said communication means;

estimating means for estimating a plurality of parameters, each parameter indicating a difference in synchronization timing based on comparing an internal clock time with a clock time of a different wireless communication apparatus; and synchronization achieving means for determining a reference communication apparatus to be a reference for time synchronization, the determining the reference communication apparatus being based on the differences in synchronization timing indicated by the plurality of estimated parameters, and achieving the time synchronization with the reference communication apparatus as the reference, wherein when a difference in synchronization timing relative to the reference communication apparatus continues, or when beacon transmission and reception continues at other than intended times, said synchronization achieving means performs a time synchronization correction process with a predetermined probability.

17. A wireless communication method for operating communication stations in a wireless communication environment, the communication stations configured to operate independently of a control station, said wireless communication method comprising:

time synchronization comparing for comparing an internal time synchronization with a time synchronization of a different communication station; and synchronization achieving for determining whether the internal time synchronization needs correction due to a number of consecutive frames for which a time synchronization deviation is detected based on a result of the time synchronization comparing, and when the internal time synchronization needs correction, to determine whether or not to perform one of a plurality of methods of a time synchronization correcting process with a predetermined probability $\alpha(0<\alpha<1)$.

18. A wireless communication method for operating communication stations in a wireless communication environment, the communication stations configured to operate independently of a control station, said wireless communication method comprising:

estimating, for estimating a plurality of parameters, each parameter associated with a different one of the communication stations and indicating a difference in synchronization timing based on comparing an internal clock time with a clock time of the different communication station; and synchronization achieving, for determining one of the different communication stations to be a reference communication station for time synchronization respective to the plurality of communication stations, the determining being based on the differences in synchronization timing indicated by the plurality of estimated parameters, and achieving the time synchronization respective to the plurality of communication stations with the reference communication station as the reference.

19. A computer readable storage medium in which a program is recorded for operating communication stations in a wireless communication environment independently of a control station, said program, when executed by a processor, executing a method comprising:
  estimating, for estimating a plurality of parameters, each parameter associated with a different one of the communication stations and indicating a difference in synchronization timing based on comparing an internal clock time with a clock time of the different communication station; and
  synchronization achieving, for determining one of the different communication stations to be a reference communication station for time synchronization respective to the plurality of communication stations, the determining being based on the differences in synchronization timing indicated by the plurality of estimated parameters, and achieving the time synchronization respective to the plurality of communication stations with the reference communication station as the reference.

* * * * *